US011665268B2

(12) United States Patent
Shankar et al.

(10) Patent No.: US 11,665,268 B2
(45) Date of Patent: May 30, 2023

(54) CUSTOMIZATION IN STANDARD APPLICATION PROGRAMMING INTERFACES (APIS) PROVIDED BY A CLOUD COMPUTING PLATFORM

(71) Applicant: salesforce.com, inc., San Francisco, CA (US)

(72) Inventors: Ravi Shankar, Telangana (IN); Manasa Ranjan Tripathy, Telangana (IN)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/444,164

(22) Filed: Jul. 30, 2021

(65) Prior Publication Data

US 2023/0030187 A1 Feb. 2, 2023

(51) Int. Cl.
*G06F 3/00* (2006.01)
*H04L 69/329* (2022.01)
*G06F 9/54* (2006.01)

(52) U.S. Cl.
CPC .............. *H04L 69/329* (2013.01); *G06F 9/54* (2013.01)

(58) Field of Classification Search
CPC ........................................................ G06F 9/54
USPC ........................................................ 719/328
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |

(Continued)

OTHER PUBLICATIONS

David Bernstein, Intercloud Federation using via Semantic Resource Federation API and Dynamic SDN Provisioning. (Year: 2022).*

(Continued)

*Primary Examiner* — Lechi Truong
(74) *Attorney, Agent, or Firm* — LKGlobal | Lorenz & Kopf, LLP

(57) ABSTRACT

Technologies are provided for supporting tenant customizations in a cloud computing platform. A standard application programming interface (API) can be defined to support a generic set of parameters that allow tenant-specified custom data to be passed to and from the standard API. The generic set of parameters allow the standard API to process requests and responses that include a payload that comprises tenant-specified custom data. The payload allows the tenant-specified custom data to be passed to and from the standard API. When a request is received at the cloud computing platform, a request payload of the request, that includes tenant-specified custom data, can be processed at the standard API, and a response can be sent from the cloud computing platform that includes a response payload that includes the tenant-specified custom data.

8 Claims, 12 Drawing Sheets

(56) References Cited

U.S. PATENT DOCUMENTS

| | | |
|---|---|---|
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,416,996 B1 * | 9/2019 | Samprathi ............... G06F 9/541 |
| 11,303,647 B1 * | 4/2022 | Wu ..................... H04L 63/0815 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2017/0154101 A1 * | 6/2017 | Raghavan ............. G06F 40/177 |
| 2017/0344547 A1 * | 11/2017 | Smith ................... G06F 40/197 |
| 2020/0379829 A1 * | 12/2020 | Vasilevskiy ............. G06F 9/547 |
| 2022/0092028 A1 * | 3/2022 | Layton .................. G06F 16/164 |
| 2022/0147996 A1 * | 5/2022 | Paranjpe ............. G06Q 20/123 |

OTHER PUBLICATIONS

Patrice Godefroid, Intelligent REST API Data Fuzzing. (Year: 2020).*

* cited by examiner

Example of using payment API using custom fields:

Sample Request Payload.

```
{
  "amount": 150$,
  "comments": "capture request"
  "creditCard":{
    "cardNUmber":"4111111111111111",
    "cvv":"123",
    "name":"Ravi Shankar",
    "customFields":{
      "middleName":"Peter"
          Key         Value
    }
  }
}
```
610
612 — "middleName":"Peter" (Key / Value)

Sample Response Payload.

```
{
  "gatewayResponse" : {
    "gatewayDate" : "2019-10-23T15:21:58.833z",
    "gatewayReferenceNumber" : "4397770772",
    "gatewayResultCode" : "00"
    "gatewyResultCodeDescription" : "Transaction Normal",
    "salesforceResultCode" : "Success"
  },
  "payment" : {
    "amount" : 150.0,
    "currencyIsoCode" : "USD",
    "effectiveDate" : "2019-10-18T11:32:27.000z",
    "id" : "0aQR00000004Cf1MAE"
    "paymentNumber" : "P-000000004",
    "requestDate" : "2019-10-23T15:21:58.000z",
    "status" : "Processed"
  },
  "creditCard":{
    "id":"c4rx00000000001EAA"
    "name":"ravi shankar",
    "customFields":{
      "securityCode":"21"
          Key         Value
    }
  }
}
```
620
622 — "securityCode":"21" (Key / Value)

FIG. 6

Example of payment API with custom object:

Sample Request Payload.

```
{
  "amount": 150$,
  "comments": "capture request"
  "customObject":{
    "name":"bitCoin",
    "username":"userName",
    "passcode":"1212",
    "hash":"1212"
  }
}
```

712: Keys / Values
710: entire request

Sample Response Payload.

```
{
  "gatewayResponse" : {
    "gatewayDate" : "2019-10-23T15:21:58.833z",
    "gatewayReferenceNumber" : "4397770772",
    "gatewayResultCode" : "00",
    "gatewyResultCodeDescription" : "Transaction Normal",
    "salesforceResultCode" : "Success"
  },
  "payment" : {
    "amount" : 150.0,
    "currencyIsoCode" : "USD",
    "effectiveDate" : "2019-10-18T11:32:27.000z",
    "id" : "0aQR00000004Cf1MAE"
    "paymentNumber" : "P-000000004",
    "requestDate" : "2019-10-23T15:21:58.000z",
    "status" : "Processed"
  },
  "customObject":{
    "id":"3edAx00000000001EAA"
    "name":"bitCoin",
    "username":"userName",
    "passcode":"12**"
  }
}
```

722: Keys / Values
720: entire response

FIG. 7

Example of order API with custom fields:

Sample Request Payload.

```
{
  "comments": "place order request"
  "orderItems":{
    "name":"shirt",
    "quantity":1,
    "customFields":{
        "discount":"10%"   }812
    }    Key     Value
  }
}
```
810

Sample Response Payload.

```
{
  "comments": "place order successfull"
  "orderItems":{
    "id":"802x0000000WCkhAAG",
    "name":"shirt",
    "quantity":1,
    "customFields":{
        "discount":"10%"   }822
    },   Key     Value
    "totalPrice":"99"
  }
}
```
820

FIG. 8

CUSTOMIZATION IN STANDARD APPLICATION PROGRAMMING INTERFACES (APIS) PROVIDED BY A CLOUD COMPUTING PLATFORM

TECHNICAL FIELD

Embodiments of the subject matter described herein relate generally to cloud computing platforms, and more particularly, embodiments of the subject matter relate to supporting tenant customizations in a standard application programming interface (API) provided by a cloud computing platform.

BACKGROUND

Today many enterprises now use cloud-based computing platforms that allow services and data to be accessed over the Internet (or via other networks). Infrastructure providers of these cloud-based computing platforms offer network-based processing systems that often support multiple enterprises (or tenants) using common computer hardware and data storage. "Cloud computing" services provide shared resources, software, and information to computers and other devices upon request. In cloud computing environments, software can be accessible over the Internet rather than installed locally on in-house computer systems. This "cloud" computing model allows applications to be provided over a platform "as a service" supplied by the infrastructure provider. The infrastructure provider typically abstracts the underlying hardware and other resources used to deliver a customer-developed application so that the customer no longer needs to operate and support dedicated server hardware. Cloud computing typically involves over-the-Internet provision of dynamically scalable and often virtualized resources. Technological details can be abstracted from the users, who no longer have need for expertise in, or control over, the technology infrastructure "in the cloud" that supports them. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without compromising data security. Generally speaking, multi-tenancy refers to a system where a single hardware and software platform simultaneously supports multiple organizations or tenants from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost-effective sharing of similar application feature software between multiple sets of users.

In general, businesses use a customer relationship management (CRM) system (also referred to as a database system or system) to manage business relationships and information associated with the business relationship. For example, a multi-tenant system may support an on-demand CRM application that manages the data for a particular organization's sales staff that is maintained by the multi-tenant system and facilitates collaboration among members of that organization's sales staff (e.g., account executives, sales representatives, and the like). This data may include customer and prospect contact information, accounts, leads, and opportunities in one central location. The information may be stored in a database as objects. For example, the CRM system may include "account" object, "contact" object and "opportunities" object.

A cloud computing platform, such as Salesforce.com®, can provide a lot of standard functionality, or out-of-the-box (OOB) products and features, that tenants can use to run their businesses. For example, Salesforce.com® provides CRM applications and services as a platform with many OOB solutions that employ standard Application Programming Interfaces (APIs). Standard APIs can be developed as part of a software provided as service by the cloud computing platform, and can vary in terms of their functionality. Standard APIs are available to all tenants of the cloud computing platform and are common to all tenants meaning that they provide all tenants with the same, special functionality. Standard APIs are often backed by standard objects. Standard APIs and standard objects provided by the cloud computing platform are backed by and designed to work with existing data models of the cloud computing platform.

The discussion above is merely provided for general background information and is not intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 6 is an example that illustrates a request payload and a response payload that can be used in the implementation of a standard payment API that uses custom fields in accordance with the disclosed embodiments.

FIG. 7 is an example that illustrates a request payload and a response payload that can be used in the implementation of a standard payment API that uses custom objects in accordance with the disclosed embodiments.

FIG. 8 is an example that illustrates a request payload and a response payload that can be used in the implementation of a standard order API that uses custom fields in accordance with the disclosed embodiments.

DETAILED DESCRIPTION

Figure 1:
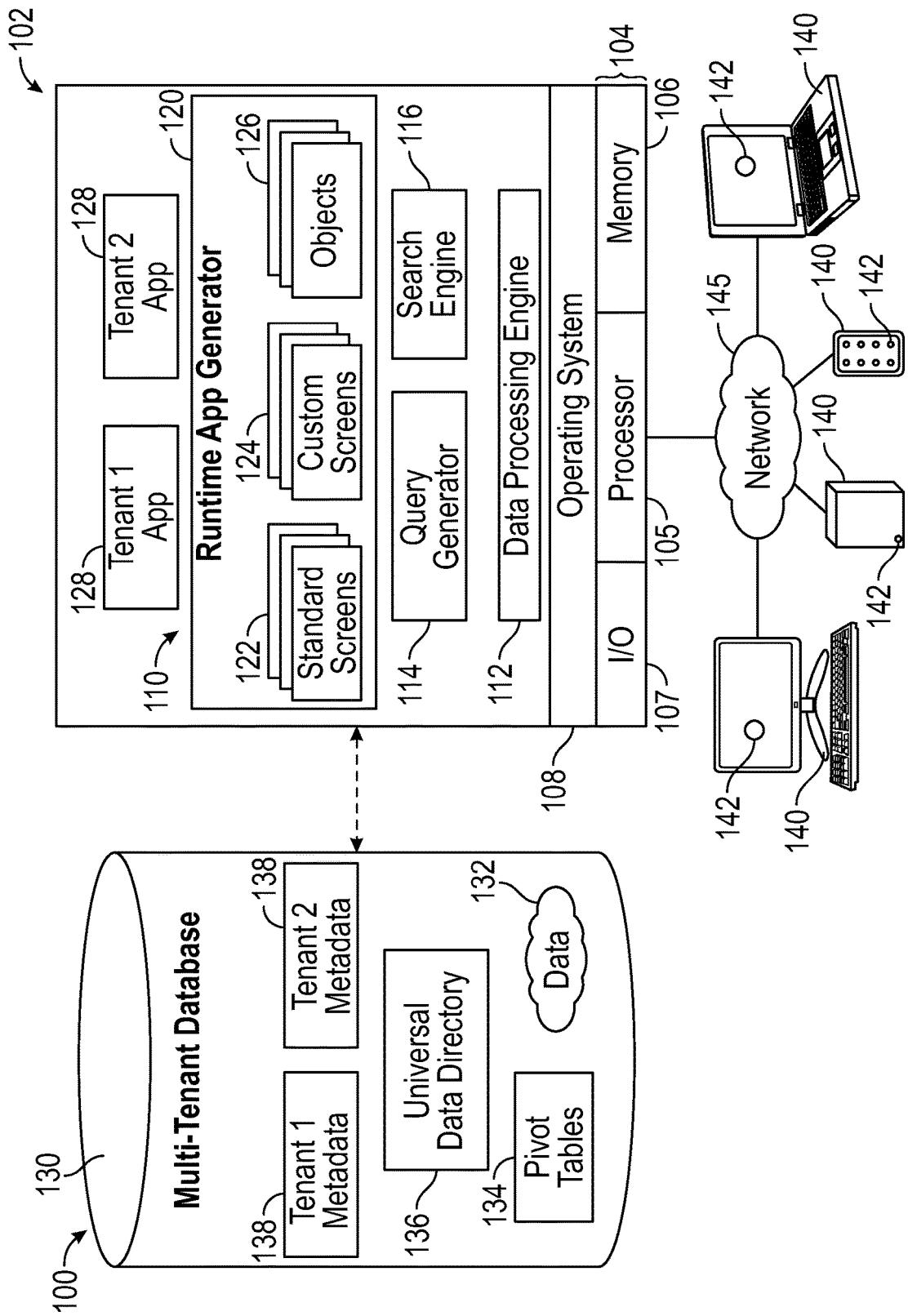
FIG. 1 is a schematic block diagram of an example of a multi-tenant computing environment in which features of the disclosed embodiments can be implemented in accordance with the disclosed embodiments.

As described above, standard APIs are available to all tenants of the cloud computing platform and are common to all tenants meaning that they provide all tenants with same, special functionality. In some cases, standard APIs and standard objects that are provided by a cloud computing platform may not include all of the features that are needed or wanted by a particular tenant. In such cases, a tenant may need customizations to fit their needs or requirements.

To address this problem, tenants can customize standard objects to create their own customizations by creating or defining custom objects (e.g., custom database tables that allow tenants to store information unique to their organization) and/or custom fields. These customizations allow tenants to adapt standard objects and extend their organization's data so that the resulting applications suit their needs and provide desired features that would not otherwise be provided by the standard objects. This way, tenants can customize and build business applications so that they are tailored to their company's unique needs and requirements.

However, one drawback of this customization approach is that there is currently no way for standard APIs to support tenant customizations (e.g., there is no way to use tenant customizations in conjunction with standard APIs). As such, the standard APIs provided by the cloud computing platform are unaware of customizations and are not designed to work with and support customizations by a tenant such as those described above. This can make it difficult for tenants to integrate customizations with standard APIs provided by the cloud computing platform. If a tenant wants to use customizations, tenants can not reuse standard APIs, but must write their own APIs which is time consuming and costly. As such, integrating the customizations with the standard APIs and standard objects of the cloud computing platform can present challenges from the perspective of the tenants of the cloud computing platform and their end users.

It would be desirable to provide a cloud computing platform (e.g., that provides clients with CRM applications and services) having standard APIs that can provide the flexibility to work with customizations made by tenants. In accordance with the disclosed embodiments, technologies are provided for supporting tenant customizations in a standard API provided by a cloud computing platform. The term "standard API" can refer, for example, to any API (e.g., process API) exposed by a software product out-of-the-box (OOB) and that is standard for multiple clients (e.g., tenants). A standard API can be backed by one or more standard objects that include one or more standard fields, and in many cases, many standard fields. The cloud computing platform may provide any number of standard APIs, and at least some of the standard APIs may be backed by multiple standard objects. The standard APIs are written without knowledge of tenant-specified custom data; however, in accordance with the disclosed embodiments, the standard APIs can be defined to support customizations (e.g., custom object(s) and custom field(s)) by tenants. Non-limiting examples of standard APIs may include, but are not limited to, Simple Object Access Protocol (SOAP) API(s), Representational State Transfer (REST) API(s), bulk API(s), streaming API(s), Chatter® REST API(s), user interface API(s), analytics REST API(s), metadata API(s), APEX® REST API(s), APEX® SOAP API(s), tooling API(s), etc.

In accordance with the disclosed embodiments, the standard API may be defined (e.g., developed) to support a generic set of parameters that allow tenant-specified custom data to be passed to and from the standard API. The generic set of parameters allow the standard API to process requests and responses that include a payload that includes tenant-specified custom data. The payload allows the tenant-specified custom data to be passed to and from the standard API. The generic set of parameters can be additional code that is defined, for example, in the form of a map that includes one or more key-value pair(s), where each key represents the tenant-specified custom data and each value represents a value for that tenant-specified custom data. As used herein, "tenant-specified" custom data may refer to any customized data that a tenant specifies, defines and/or customizes on their organization or "org," including customizations, such as custom objects and/or custom fields, for example.

A request may be sent to the cloud computing platform from an external customer of a client or tenant of the cloud computing platform. The request comprises a request payload that includes the tenant-specified custom data (e.g., one or more tenant customizations and data for each customization). The tenant-specified custom data may include, for example, one or more key-value pairs for custom data (e.g., custom objects and/or custom fields). When the request is received at the standard API, the standard API processes the request payload, which includes the tenant-specified custom data. In some implementations, the standard API can optionally validate the tenant-specified custom data included in the request payload. The type of validation performed by the standard API may vary depending on the implementation. After processing by the standard API, a response may be sent from the cloud computing platform back to the external customer. The response can include a response payload that includes the tenant-specified custom data.

In one embodiment, technologies described above can be used in conjunction with a cloud-based computing system that includes a core cloud computing platform, such as, Salesforce.com®. The core cloud computing platform can include a multitenant database system that is configurable to provide applications and services to a plurality of clients. Each client can be, for example, a tenant of an organization of the cloud computing platform. Each client can have one or more external customers (e.g., who are external to the cloud computing platform). The core cloud computing platform can thus provide applications and services to multiple tenants or organizations via the cloud computing platform. One example of such a system will now be described below with reference to FIG. 1 and other examples of such systems will be described below with reference to FIGS. 2-12.

FIG. 1 is a schematic block diagram of an example of a multi-tenant computing environment in which features of the disclosed embodiments can be implemented in accordance with the disclosed embodiments. As shown in FIG. 1, an exemplary cloud-based solution may be implemented in the context of a multi-tenant system 100 including a server 102 that supports applications 128 based upon data 132 from a database 130 that may be shared between multiple tenants, organizations, or enterprises, referred to herein as a multi-tenant database. The multi-tenant system 100 can be shared by many different organizations, and handles the storage of, and access to, different metadata, objects, data and applications across disparate organizations. In one embodiment, the multi-tenant system 100 can be part of a database system, such as a multi-tenant database system.

The multi-tenant system 100 can provide applications and services and store data for any number of organizations. Each organization is a source of metadata and data associated with that metadata that collectively make up an application. In one implementation, the metadata can include customized content of the organization (e.g., customizations done to an instance that define business logic and processes for an organization). Some non-limiting examples of metadata can include, for example, customized content that describes a build and functionality of objects (or tables), tabs, fields (or columns), permissions, classes, pages (e.g., Apex pages), triggers, controllers, sites, communities, workflow rules, automation rules and processes, etc. Data is associated with metadata to create an application. Data can be stored as one or more objects, where each object holds particular records for an organization. As such, data can include records (or user content) that are held by one or more objects.

The multi-tenant system 100 allows users of user systems 140 to establish a communicative connection to the multi-tenant system 100 over a network 145 such as the Internet or any type of network described herein. Based on a user's interaction with a user system 140, the application platform 110 accesses an organization's data (e.g., records held by an object) and metadata that is stored at one or more database systems 130, and provides the user system 140 with access to applications based on that data and metadata. These applications are executed or run in a process space of the application platform 110 will be described in greater detail below. The user system 140 and various other user systems (not illustrated) can interact with the applications provided by the multi-tenant system 100. The multi-tenant system 100 is configured to handle requests for any user (e.g., customer) associated with any organization that is a tenant of the system. Data and services generated by the various applications 128 are provided via a network 145 to any number of user systems 140, such as desktops, laptops, tablets, smartphones or other client devices, Google Glass™ and any other computing device implemented in an automobile, aircraft, television, or other business or consumer electronic device or system, including web clients.

Each application 128 is suitably generated at run-time (or on-demand) using a common application platform 110 that securely provides access to the data 132 in the database 130 for each of the various tenant organizations subscribing to the system 100. The application platform 110 has access to one or more database systems 130 that store information (e.g., data and metadata) for a number of different organizations including user information, organization information, custom information, etc. The database systems 130 can include a multi-tenant database system 130 as described with reference to FIG. 1, as well as other databases or sources of information that are external to the multi-tenant database system 130 of FIG. 1. In accordance with one non-limiting example, the service cloud 100 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that share access to a common subset of the data within the multi-tenant database 130. In this regard, each tenant includes one or more users and/or groups associated with, authorized by, or otherwise belonging to that respective tenant. Stated another way, each respective user within the multi-tenant system 100 is associated with, assigned to, or otherwise belongs to a particular one of the plurality of enterprises supported by the system 100. In some implementations, a tenant can include a group of users who share a common access with specific privileges to a software instance. A multi-tenant architecture provides a tenant with a dedicated share of the software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

Each enterprise tenant may represent a company, corporate department, business or legal organization, and/or any other entities that maintain data for particular sets of users (such as their respective employees or customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other organizations.

The multi-tenant database 130 may be a repository or other data storage system capable of storing and managing the data 132 associated with any number of tenant organizations. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

In an exemplary embodiment, the database 130 includes a database management system or other equivalent software capable of determining an optimal query plan for retrieving and providing a particular subset of the data 132 to an instance of application (or virtual application) 128 in response to a query initiated or otherwise provided by an application 128, as described in greater detail below. The multi-tenant database 130 may alternatively be referred to herein as an on-demand database, in that the database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants.

Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like.

The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short-term or long-term storage or other computer-readable media capable of storing programming instructions for execution on the processor 105, including any sort of random-access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The server 102, application platform 110 and database systems 130 can be part of one backend system. Although not illustrated, the multi-tenant system 100 can include other backend systems that can include one or more servers that work in conjunction with one or more databases and/or data processing components, and the application platform 110 can access the other backend systems.

The multi-tenant system 100 includes one or more user systems 140 that can access various applications provided by the application platform 110. The application platform 110 is a cloud-based user interface. The application platform 110 can be any sort of software application or other data processing engine that generates the virtual applications 128 that provide data and/or services to the user systems 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the user systems 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the user systems 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its user system 140, as appropriate.

The runtime application generator 120 suitably interacts with the query generator 114 to efficiently obtain multi-tenant data 132 from the database 130 as needed in response to input queries initiated or otherwise provided by users of the user systems 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled user system 140 on the network 145. In an exemplary embodiment, the user system 140 includes a display device, such as a monitor, screen, or another conventional electronic display capable of graphically presenting data and/or information retrieved from the multi-tenant database 130, as described in greater detail below.

Typically, the user operates a conventional browser application or other client program 142 executed by the user system 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. However, if a user chooses to manually upload an updated file (through either the web-based user interface or through an API), it will also be shared automatically with all of the users/devices that are designated for sharing.

As noted above, the virtual application 128 may contain JAVA®, ActiveX, or other content that can be presented using conventional client software running on the user system 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128.

Objects and Records

In one embodiment, the multi-tenant database system 130 can store data in the form of records and customizations. As used herein, the term "record" can refer to a particular occurrence or instance of a data object that is created by a user or administrator of a database service and stored in a database system, for example, about a particular (actual or potential) business relationship or project. The data object can have a data structure defined by the database service (a standard object) or defined by a subscriber (custom object).

An object can refer to a structure used to store data and associated metadata along with a globally unique identifier (called an identity field) that allows for retrieval of the object. In one embodiment implementing a multi-tenant database, all of the records for the tenants have an identifier stored in a common table. Each object comprises a number of fields. A record has data fields that are defined by the structure of the object (e.g. fields of certain data types and purposes). An object is analogous to a database table, fields of an object are analogous to columns of the database table, and a record is analogous to a row in a database table. Data is stored as records of the object, which correspond to rows in a database. The terms "object" and "entity" are used interchangeably herein. Objects not only provide structure for storing data, but can also power the interface elements that allow users to interact with the data, such as tabs, the layout of fields on a page, and lists of related records. Objects can also have built-in support for features such as access management, validation, formulas, triggers, labels, notes and attachments, a track field history feature, security features, etc. Attributes of an object are described with metadata, making it easy to create and modify records either through a visual interface or programmatically.

A record can also have custom fields defined by a user. A field can be another record or include links thereto, thereby providing a parent-child relationship between the records. Customizations can include custom objects and fields, Apex Code, Visualforce, Workflow, etc.

Examples of objects include standard objects, custom objects, and external objects. A standard object can have a pre-defined data structure that is defined or specified by a database service or cloud computing platform. A standard object can be thought of as a default object. For example, in one embodiment, a standard object includes one or more pre-defined fields that are common for each organization that utilizes the cloud computing platform or database system or service.

A few non-limiting examples of different types of standard objects can include sales objects (e.g., accounts, contacts, opportunities, leads, campaigns, and other related objects); task and event objects (e.g., tasks and events and their related objects); support objects (e.g., cases and solutions and their related objects); salesforce knowledge objects (e.g., view and vote statistics, article versions, and other related objects); document, note, attachment objects and their related objects; user, sharing, and permission objects (e.g., users, profiles, and roles); profile and permission objects (e.g., users, profiles, permission sets, and related permission objects); record type objects (e.g., record types and business processes and their related objects); product and schedule objects (e.g., opportunities, products, and schedules); sharing and team selling objects (e.g., account teams, opportunity teams, and sharing objects); customizable forecasting objects (e.g., includes forecasts and related objects); forecasts objects (e.g., includes objects for collaborative forecasts); territory management (e.g., territories and related objects associated with territory management); process objects (e.g., approval processes and related objects); content objects (e.g., content and libraries and their related objects); chatter feed objects (e.g., objects related to feeds); badge and reward objects; feedback and performance cycle objects, etc. For example, a record can be for a business partner or potential business partner (e.g. a client, vendor, distributor, etc.) of the user, and can include an entire company, subsidiaries, or contacts at the company. As another example, a record can be a project that the user is working on, such as an opportunity (e.g. a possible sale) with an existing partner, or a project that the user is working on.

By contrast, a custom object can have a data structure that is defined, at least in part, by an organization or by a user/subscriber/admin of an organization. For example, a custom object can be an object that is custom defined by a user/subscriber/administrator of an organization, and includes one or more custom fields defined by the user or the particular organization for that custom object. Custom objects are custom database tables that allow an organization to store information unique to their organization. Custom objects can extend the functionality that standard objects provide.

In one embodiment, an object can be a relationship management entity having a record type defined within a platform that includes a customer relationship management (CRM) database system for managing a company's relationships and interactions with their customers and potential customers. Examples of CRM entities can include, but are not limited to, an account, a case, an opportunity, a lead, a project, a contact, an order, a pricebook, a product, a solution, a report, a forecast, a user, etc. For instance, an opportunity can correspond to a sales prospect, marketing project, or other business-related activity with respect to which a user desires to collaborate with others.

An account object may include information about an organization or person (such as customers, competitors, and partners) involved with a particular business. Each object may be associated with fields. For example, an account object may include fields such as "company", "zip", "phone number", "email address", etc. A contact object may include contact information, where each contact may be an individual associated with an "account". A contact object may include fields such as "first name", "last name", "phone number", "accountID", etc. The "accountID" field of the "contact" object may be the ID of the account that is the parent of the contact. An opportunities object includes information about a sale or a pending deal. An opportunities object may include fields such as "amount", "accountID", etc. The "accountID" field of the "opportunity" object may be the ID of the account that is associated with the opportunity. Each field may be associated with a field value. For example, a field value for the "zip" field may be "94105".

External objects are objects that an organization creates that map to data stored outside the organization. External objects are like custom objects, but external object record data is stored outside the organization. For example, data that's stored on premises in an enterprise resource planning (ERP) system can be accessed as external objects in real time via web service callouts, instead of copying the data into the organization.

As described above, technologies are provided for supporting tenant customizations in a standard API provided by a cloud computing platform. As used herein, a "standard API" can refer to an API that is exposed by a software product out-of-the-box and that is standard for multiple clients (e.g., tenants). In accordance with the disclosed embodiments, a standard API may be defined to support a generic set of parameters that allow tenant-specified custom data to be passed to and from the standard API. The generic set of parameters allow the standard API to process requests and responses that include a payload that includes tenant-specified custom data, such as custom objects, custom fields, and/or other customizations. The payload allows the tenant-specified custom data to be passed to and from the standard API. When a request is sent to the cloud computing platform, a request payload of the request, that includes tenant-specified custom data, can be processed at the standard API, and a response can be sent from the cloud computing platform that includes a response payload that includes the tenant-specified custom data. Prior to describing one non-limiting embodiment with reference to FIG. 2, some not limiting examples of standard APIs will now be described.

Non-limiting examples of standard APIs can include, but are not limited to, Simple Object Access Protocol (SOAP) API(s), representational state transfer (REST) API(s), bulk API(s), streaming API(s), Chatter REST API(s), user interface API(s), analytics REST API(s), metadata API(s), APEX® REST API(s), APEX® SOAP API(s), tooling API(s), etc. REST and SOAP APIs are two common API architectures. SOAP API and REST API are two commonly used API's to expose data from salesforce.com platform to other platforms (JAVA®, .NET®, etc) or to allow external applications to invoke APEX® methods.

SOAP API is a robust and powerful web service based on the industry-standard protocol of the same name. SOAP defines a standard communication protocol specification for XML-based message exchange. It uses a Web Services Description Language (WSDL) file to rigorously define the parameters for accessing data through the API. Because SOAP API uses the WSDL file as a formal contract between the API and consumer, it is useful for writing server-to-server integrations. Most of the SOAP API functionality is also available through REST API. SOAP API supports XML and can be used to create, update, delete, retrieve (CRUD) records in any language that supports web services. It is used to maintain passwords, perform searches, retrieve metadata, etc. SOAP can define a standard for creating web service APIs, and provide a pattern, a web service architecture, which specifies the basic rules to be considered while designing web service platforms. A SOAP message includes an envelope, inside of which are the SOAP headers and body, the actual information to send. It is based on the standard XML format, designed especially to transport and store structured data. SOAP may also refer to the format of the XML that an envelope uses. SOAP provides a heavy set of functionalities for browser-based clients due to its custom format REST API is a simple and powerful web service based on REST principles. REST API is based on representational state transfer, which is a language-independent architectural style for API and approach to communications often used in web services development. REST API supports both XML and JSON. REST APIs are a resource-oriented alternative to SOAP and use clean URLs (or REST URLs). Unlike SOAP, REST applications use the HTTP build-in headers to carry meta information. REST API uses HTTP requests to access and use data. That data can be used to perform create, read, update, and delete (CRUD) operations concerning resources (e.g., create, read, update, and delete records), which are referred to as GET, POST, PUT, and DELETE operations in REST API parlance. Because REST API calls are stateless, nothing can be retained by a REST service between executions. This is an advantage for distributed internet applications because stateless components can be freely redeployed if something fails, and they can quickly be scaled to accommodate load changes. Today, many APIs are REST in order to accommodate the various types of syntax and platforms that different servers use. The REST model is useful when used, for example, in conjunction with cloud services because binding to a service through an API controls how the URL will be decoded.

Bulk API is a specialized REST API for loading and querying large amounts of data at once. Bulk API is asynchronous, meaning that a request can be submitted and that a response with results can come back later. Bulk API is useful, for example, in performing tasks that involve lots of records (e.g., 50,000 records or more).

Streaming API is a specialized API for setting up notifications that trigger when changes are made to data. It uses a publish-subscribe (pub/sub) model in which users can subscribe to channels that broadcast certain types of data changes. The pub/sub model reduces the number of API requests by eliminating the need for polling. Streaming API is useful, for example, in writing apps that would otherwise need to frequently poll for changes.

Figure 2:
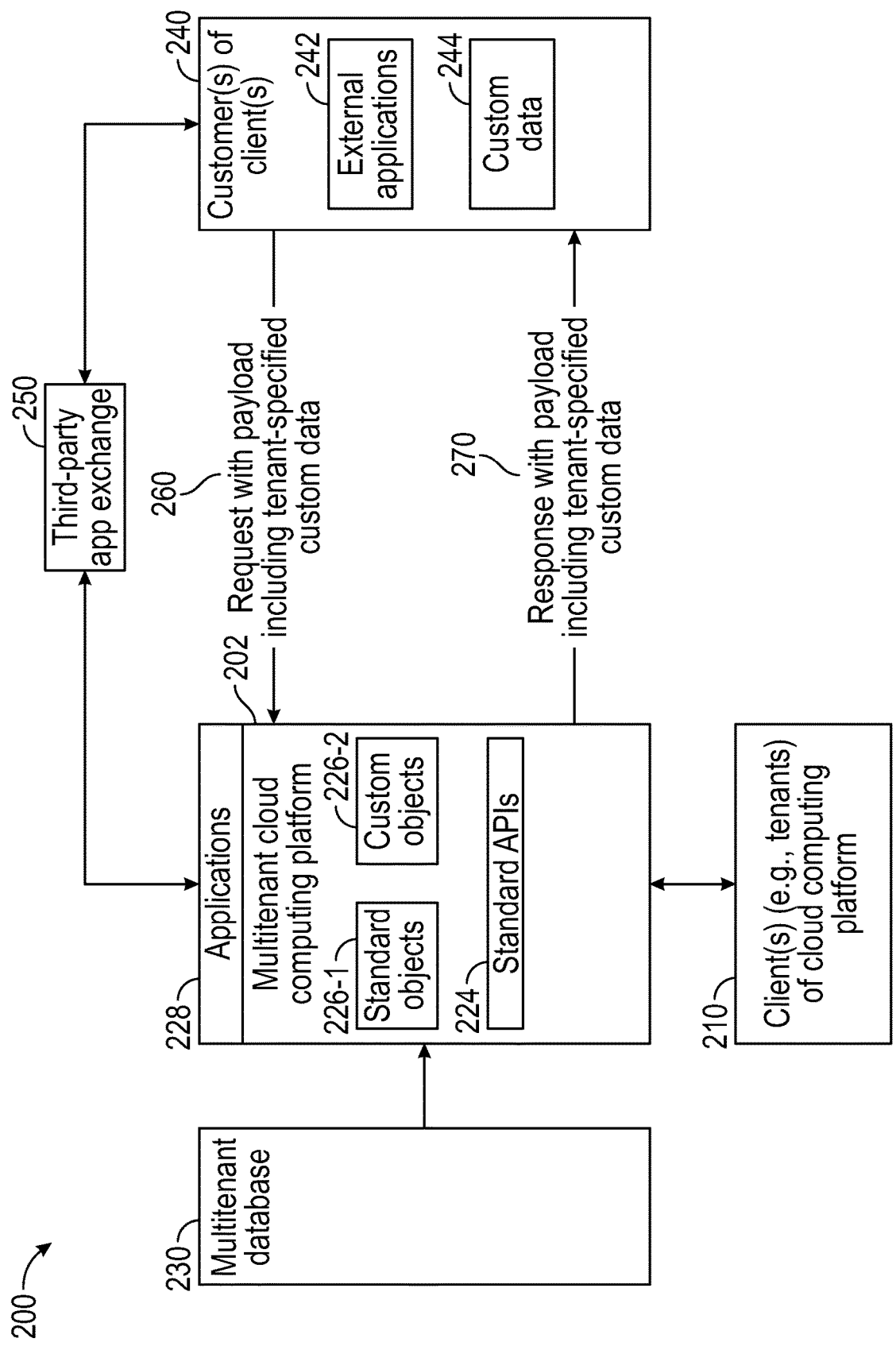
FIG. 2 is a block diagram that illustrates a system in accordance with the disclosed embodiments.

FIG. 2 is a block diagram that illustrates a system 200 in accordance with the disclosed embodiments. The system includes a cloud computing platform 202, a database system 230, one or more clients 210 (e.g., tenants) of the cloud computing platform 202, one or more customer systems 240 associated with customers of the one or more clients 210, and optionally, a third-party application exchange 250. In this simplified representation of the cloud computing platform 202 shown in FIG. 2, the cloud computing platform 202 includes one or more standard APIs 224 and one or more tenant applications 228 that are composed of one or more standard objects 226-1 and/or one or more custom objects 226-2. While this representation is simplified for sake of clarity, it should be appreciated that the cloud computing platform 202 can include other features such as those described above with reference to FIG. 1, and those that will be described with reference to FIGS. 3-13. Further, in this simplified representation shown in FIG. 2, each of the customer systems 240 can include one or more external applications 242 and custom data 244, but it should be appreciated that each customer systems 240 represents a computer-based entity that can include other features, as described, for example, with reference to FIG. 13 for carrying out the functionality described herein including communicating requests to the cloud computing platform 202 and receiving responses from the cloud computing platform 202.

The standard APIs 224 serve as interfaces between tenant applications 228 of the cloud computing platform 202 and external applications 242 of the customer systems 240. The cloud computing platform 228 can provide any number of standard APIs 224. Each of the standard APIs 224 is backed by at least one standard object 226-1. In some implementations, at least some of the standard APIs 224 can be backed by multiple standard objects. Each standard object 226-1 can include one or more standard fields, and in many cases, many standard fields.

As described above, there can be standard objects 226-1 (e.g., like Accounts and Contacts) and custom objects 226-2 (e.g., a property object). Standard objects 226-1 are objects that are included out-of-the-box by the cloud computing platform 202 and are standard for all organizations or tenants of the cloud computing platform 202. In one implementation, a few non-limiting examples of standard objects 226-1 can include common business objects like an account object, a contact object, a lead object, an opportunity object, etc. Custom objects 226-2 are created to store information that is specific to an organization or tenant based on their needs in the context of a particular application.

Objects 226 are containers for information, but they also provide special functionality. For example, when a custom object 226-2 is created, the platform 202 can automatically build things like a page layout for a user interface. Both standard objects 226-1 and custom objects 226-2 have fields, which can be thought of as columns of a database table, and can hold records, which can be thought of as rows of the database table. In other words, any given object can include a number of fields with one or more identically structured records. Records can be implemented as rows in object database tables, whereas fields are columns in object database tables. Records are the actual data associated with an object 226. The cloud computing platform 202 can be used to develop custom objects 226-2 and functionality specific to an organization or "org", where an org can be a specific instance of Salesforce.com®. In some cases, a company can have one or multiple orgs, and an org can have one or multiple tenants.

The tenant applications 228 of the cloud computing platform 202 may be composed of one or more standard objects 226-1 and/or one or more custom objects 226-2. Objects 226 can be database tables in the database 230 that store a particular kind of information. Each tenant application 228 can be composed of a set of objects 226, fields, and/or other functionality that supports a business process of a particular organization or tenant. A data model can refer to the collection of objects 226 and fields in an instance of a tenant application 228.

Tenant-Specified Custom Data

For sake of simplicity, the following description will refer to "tenant-specified" custom data. However, it should be appreciated that the terms "tenant-specified" custom data and "organization-specified" custom data can be used interchangeably. Tenant-specified custom data can also be referred to as organization-defined custom data herein. Likewise, organization-specified custom data can also be referred to as tenant-defined custom data herein. As used herein, tenant-specified custom data (or organization-specified custom data) may refer to any customized data that a client (e.g., tenant) specifies, defines and/or customizes on their organization or "org."

Tenant-specified custom data is data that is not normally consumable by a standard API. Tenant-specified custom data is data that is not normally processed by a standard API due to the underlying data model and contract. Tenant-specified custom data is data that is not normally returned by a standard API. In general terms, tenant-specified custom data can include any customizations by a tenant that are not normally accepted for usage with or consumed by the standard APIs of the cloud computing platform 202. As will be described below, tenant-specified custom data allows clients 210 to interact with external applications 242 of their customers 240 so that custom data 242 can be received from their customers 240 and communicated back from tenant applications 228. Customizations can include features/functionality that a tenant may want to add on top of the existing features/functionality, but that are not supported by standard APIs provided by the cloud computing platform. Non-limiting examples of tenant-specified custom data can include, but are not limited to, custom objects and/or custom fields that could not normally be processed by a standard API.

In accordance with the disclosed embodiments, the standard APIs 224 of the cloud computing platform 202 can be defined (e.g., by a developer) to support a generic set of parameters that allow tenant-specified custom data to be passed to a standard API from customers (at 260) and returned from a standard API to customers (at 270). In other words, the generic set of parameters can allow a standard API to process requests (at 260) and responses (at 270) that include a payload that includes tenant-specified custom data (or tenant customization). In one embodiment, the generic set of parameters can be implemented as a map of one or more key-value pairs. A map can be a collection of key-value pairs that maps keys to values, where each key can map to at most one value (i.e., a map cannot contain duplicate keys). For each key-value pair, each key represents tenant-specified custom data and the corresponding value is a value for the tenant-specified custom data. In one implementation, each key and value can be a primitive data type (e.g., a string data type). Each request (at 260) and response (at 270) can carry the tenant-specified custom data as a payload. The payload allows the tenant-specified custom data to be passed to the standard APIs 224 and from the standard APIs 224 even though the standard APIs 224 are written without knowledge of tenant-specified custom data. This allows the standard APIs 224 to support customizations by tenants (e.g., custom object(s) and custom field(s)). For example, customer systems 240 of a client 210 can pass requests to standard APIs 224 with one or more key-value pairs for custom data (e.g., custom objects and/or custom fields, for example), and can receive responses from standard APIs 224 with one or more key-value pairs for custom data (e.g., custom objects and/or custom fields). Non-limiting examples of such requests and responses will be described below with reference to FIGS. 5-8.

To illustrate an example transaction, at 260, a customer system 240 can send a request to a standard API 224 of the cloud computing platform 202. The request can have a request payload that includes the tenant-specified custom data. In other words, the tenant-specified custom data can be included as part of request payload (e.g., JSON payload, XML, payload, etc.). As described above, the tenant-specified custom data can include, for example, custom fields that are passed in the request payload and/or on the custom objects that are passed in the request payload. The tenant-specified custom data may include, for example, one or more key-value pairs for the tenant-specified custom data. In one implementation, the tenant-specified custom data can include one or more one or more key-value pairs for each customization.

When the cloud computing platform 202 receives the request, the standard API 224 performs processing of the request payload and operates on one or more of the standard objects 226-1.

When the standard API 224 of the cloud computing platform 202 successfully processes the request payload, the standard API 224 can generate a response having a response payload that includes the tenant-specified custom data and send the response (at 270) to the customer system 240.

Validation

When the standard APIs 224 open to support customizations via tenant-specified custom data (e.g., to pass custom fields or objects in a request), this could potentially open up a security loophole which should be managed and restricted to prevent abuses of such configurable support. Thus, in some embodiments, the processing operations performed by the standard API 224 can also include validation processes to validate the tenant-specified custom data included in the request payload and thus protect against abuses.

The type of validation performed by the standard API 224 can vary depending on the implementation. For instance, in one implementation, the standard API 224 can validate field metadata of the tenant-specified custom data included in the request payload. The field metadata that is validated can include a data type of a field, a field name length and/or a field value length of the tenant-specified custom data included in the request payload, etc. In another implementation, the standard API 224 can validate any number of custom fields included in the request payload that are allowed to be passed in a single API request. In another implementation, the standard API 224 can validate any number of custom objects included in the request payload that are allowed to be passed in a single API request. Any number of validation implementations or approaches can be used individually or in combination to validate the tenant-specified custom data included in the request payload.

As noted above, when the standard API 224 of the cloud computing platform 202 successfully processes the request payload (including validation), the standard API 224 can generate a response having a response payload that includes the tenant-specified custom data, and then send the response (at 270) to the customer system 240. In other words, if the processing operations performed by the standard API 224 are successful (including validation), the standard API 224 can return a response having a response payload that includes tenant-specified custom data (e.g., custom fields that are passed in the response payload and/or on the custom objects that are passed in the response payload). As above, the response payload can include one or more of a JSON payload, XML payload, etc. The tenant-specified custom data may include, for example, one or more key-value pairs for the tenant-specified custom data, or each customization.

Application Exchange

The third-party application exchange 250 can be an online, cloud-based, enterprise application marketplace in which applications and components are customized for the cloud computing platform 202. Depending on the particular implementation, the third-party application exchange 250 can be an entity that is in the public domain, or in the alternative, can be an entity that is part of the cloud computing platform 202.

The third-party application exchange 250 can allow providers (e.g., an organization or tenant) to write their own managed package code that integrates with the cloud computing platform 202 and publish it as a managed package via the third-party application exchange 250. An organization or tenant can create a managed package that can be downloaded and installed by many different organizations. A managed package is a container used by clients 210 of the cloud computing platform (e.g., Salesforce.com®) to distribute and sell applications. A managed package can include an individual component or a set of related apps. After creating a managed package, it can be distributed to other users and organizations. Managed packages differ from unmanaged packages by having some locked components, allowing the managed package to be upgraded later. Unmanaged packages do not include locked components and cannot be upgraded. The third-party application exchange 250 can then provide clients 210 with access to their managed packages so that clients 210 can then choose which ones they want to implement, install and instantiate them for their use.

In accordance with the disclosed embodiments, customizations made by one client (e.g., tenant) can be packaged and published as a managed package on the application exchange 250 so that they can be shared with and used by other clients (e.g., tenants) who want to use the same customizations without having to recreate them. The standard APIs of the cloud computing platform can still support those customizations without having explicit knowledge of these customizations.

Figure 3:
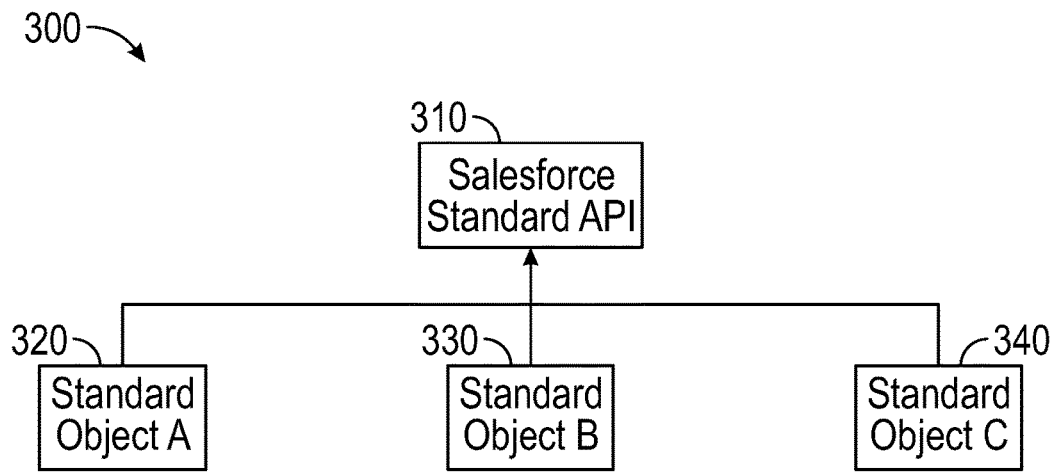
FIG. 3 is a diagram that illustrates an example of a standard API provided by a cloud computing platform (not illustrated) and its relationship to one or more standard objects defined and provided by a cloud computing platform.

FIG. 3 is a diagram 300 that illustrates an example of a standard API 310 provided by a cloud computing platform (not illustrated) and its relationship to one or more standard objects 320-340 defined and provided by a cloud computing platform. Although three standard objects 320-340 are shown for illustration purposes, it should be appreciated that a cloud computing platform (not illustrated) can define and provide any number of standard objects depending on the implementation. The standard API 310 is backed by, supports and operates in conjunction with one or more standard objects 320-340. Each standard object 320-340 can include one or more standard fields (not shown), and in many cases, many standard fields.

Figure 4:
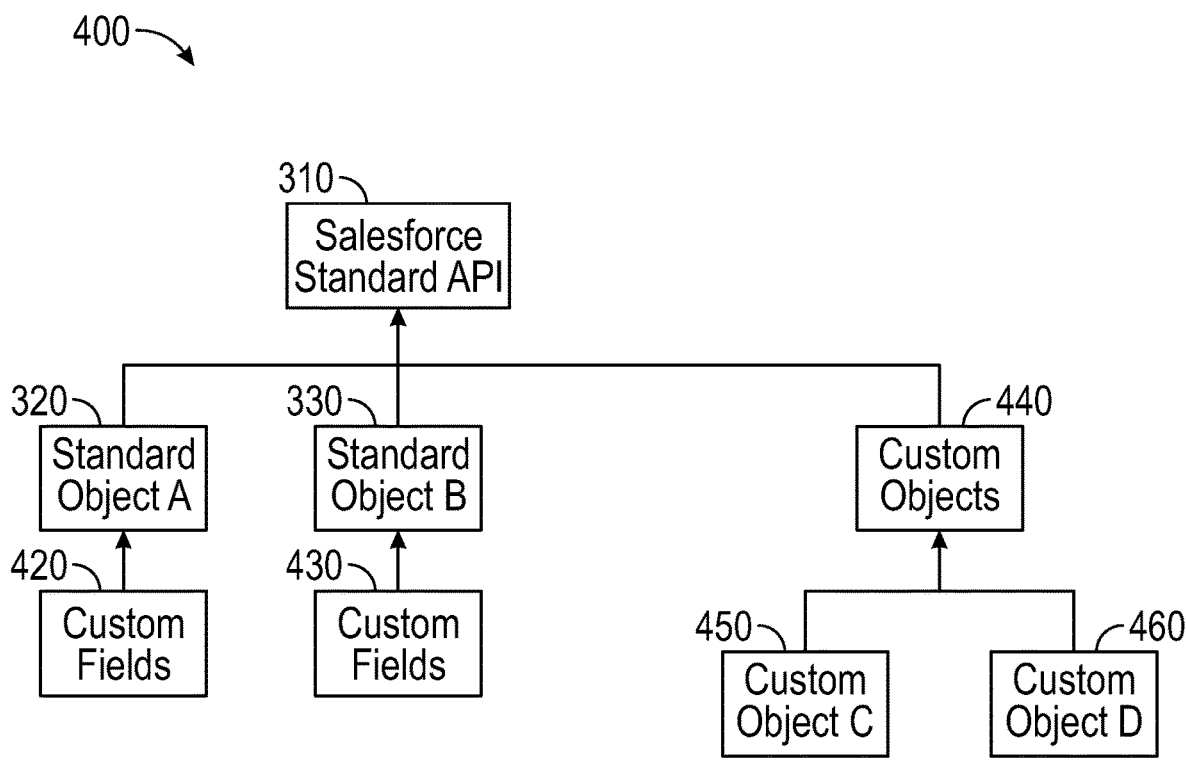
FIG. 4 is a diagram that illustrates an example of the standard API of FIG. 3 as modified in accordance with the disclosed embodiments.

FIG. 4 is a diagram 400 that illustrates an example of the standard API 310 of FIG. 3 as modified in accordance with the disclosed embodiments. As in FIG. 3, the standard API 310 of FIG. 4 that is provided by a cloud computing platform (not illustrated) is backed by, supports and operates in conjunction with one or more standard objects 320, 330 defined and provided by the cloud computing platform, where each standard object 320, 330 can include one or more standard fields (not shown). However, in accordance with the disclosed embodiments, the standard API 310 can support and operate in conjunction with tenant-specified custom data, which in this example can include one or more custom fields 420, 430 and/or one or more custom objects 440, 450, 460. In this example, the standard API 310 can support and operate in conjunction with standard object A 320 having custom fields 420, standard object B 330 having custom fields 430, and any number of custom objects 440, 450, 460. Again, as in FIG. 3, although two standard objects 320, 330 are shown in FIG. 4 for illustration purposes, it should be appreciated that a cloud computing platform (not illustrated) can define and provide any number of standard objects depending on the implementation. Similarly, although two custom fields 420, 430 and three custom objects 440, 450, 460 are shown in FIG. 4 for illustration purposes, it should be appreciated that the standard API 310 can support and operate in conjunction with any number of custom fields and/or any number of custom objects and/or other customizations (not shown) depending on the implementation.

Figure 5:
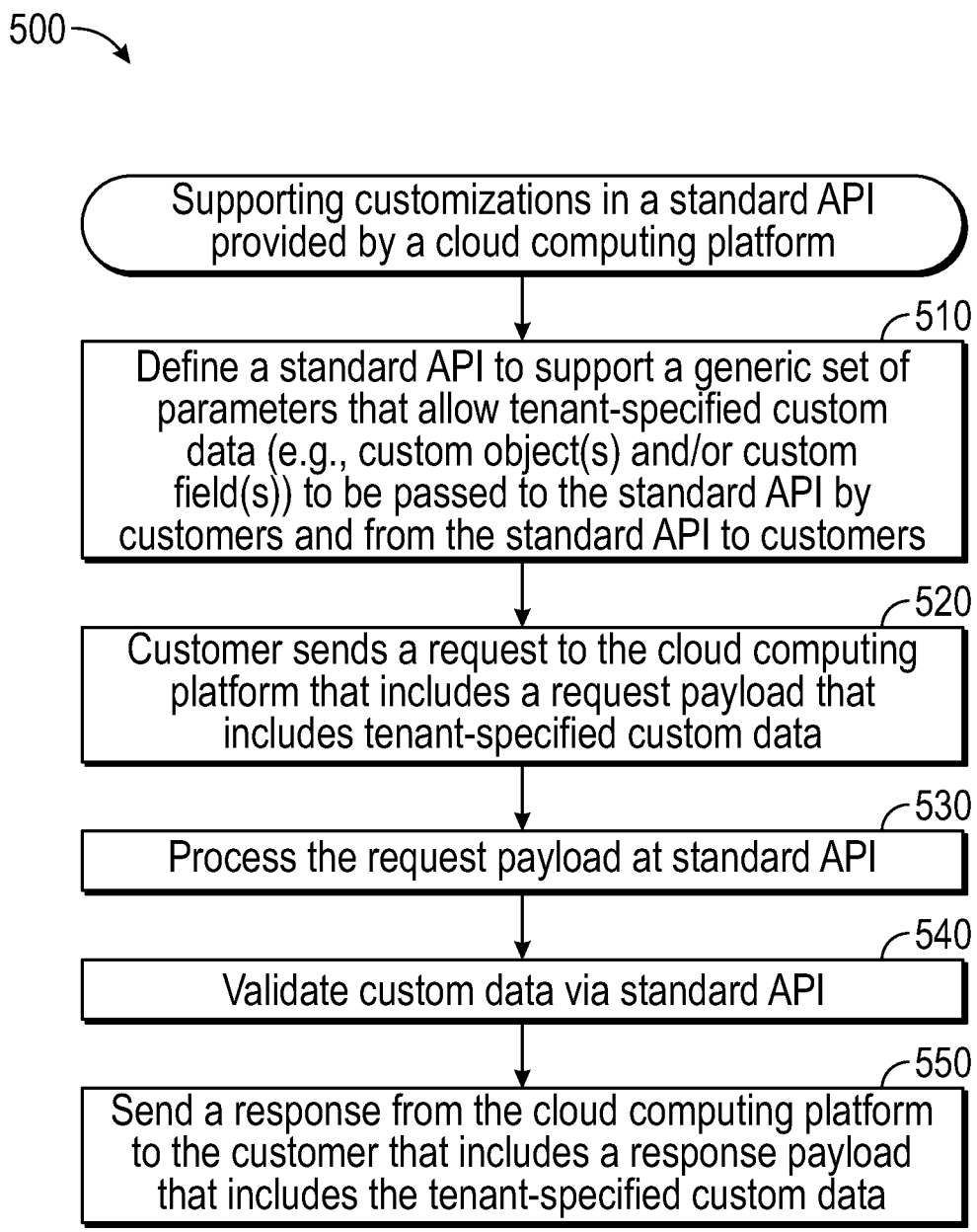
FIG. 5 is a flowchart that illustrates a method for supporting tenant customizations in a standard API provided by a cloud computing platform in accordance with the disclosed embodiments.

FIG. 5 is a flowchart that illustrates a method 500 for supporting tenant customizations in a standard API provided by a cloud computing platform in accordance with the disclosed embodiments. With respect to FIG. 5, the steps of the method 500 shown are not necessarily limiting. Steps can be added, omitted, and/or performed simultaneously without departing from the scope of the appended claims. The method 500 may include any number of additional or alternative tasks, and the tasks shown need not be performed in the illustrated order. The method may be incorporated into a more comprehensive procedure or process having additional functionality not described in detail herein. Moreover, one or more of the tasks shown could potentially be omitted from an embodiment of the method as long as the intended overall functionality remains intact. Further, the method is computer-implemented in that various tasks or steps that are performed in connection with the method may be performed by software, hardware, firmware, or any combination thereof. For illustrative purposes, the following description of the method may refer to elements mentioned above in connection with FIG. 1. In certain embodiments, some or all steps of this process, and/or substantially equivalent steps, are performed by execution of processor-readable instructions stored or included on a processor-readable medium. For instance, in the description of FIG. 5 that follows, the cloud computing platform, standard APIs and customers can be described as performing various acts, tasks or steps, but it should be appreciated that this refers to processing system(s) of these entities executing instructions to perform those various acts, tasks or steps. Depending on the implementation, some of the processing system(s) can be centrally located, or distributed among a number of server systems that work together.

As described above, the standard APIs are exposed by a software product and written without knowledge of tenant-specified custom data. As also described above, each standard API is backed by at least one standard object that can include one or more standard fields, and in many cases, many standard fields. Although the following description refers to a standard API, it should be appreciated that a cloud computing platform can provide any number of standard APIs, but one will be described for purposes of describing an example. In some implementations, the standard API is one of many standard APIs provided by the cloud computing platform, and at least some of the standard APIs can be backed by multiple standard objects.

At step 510, a standard API of the cloud computing system is defined to support a generic set of parameters that allow tenant-specified custom data to be passed to and from the standard API. The generic set of parameters allow the standard API to process requests and responses that include a payload that includes tenant-specified custom data. As described above, the generic set of parameters can be additional code that is defined, such as a map that includes one or more key-value pair(s). As will be described below, customers of the tenant can then pass requests to standard APIs with one or more key-value pairs, such as those for those custom objects and/or custom fields as two non-limiting examples. The tenant-specified custom data can include, for example, customizations, such as, one or more custom object(s), one or more custom field(s), etc., as described herein. The custom data allows an application of the cloud computing platform to work according to requirements of a tenant and/or an external application of their customer.

At step 520, a request can be sent from the customer to the cloud computing platform, and received by the cloud computing platform. The request can have a request payload that includes the tenant-specified custom data, as described above with reference to FIGS. 2-4.

At 530, the standard API of the cloud computing platform can process the request payload, which includes the tenant-specified custom data. If the processing operation performed by the standard API is successful, the standard API can return a response with tenant-specified custom, as will be described below with reference to 550.

As noted above with reference to FIG. 2, in some embodiments, the processing performed by the standard API can also validate the tenant-specified custom data included in the request payload to protect against abuses of such configurable support. In one embodiment, at optional step 540, the standard API of the cloud computing platform can validate the tenant-specified custom data included in the request payload. As described above with reference to FIG. 2, the type of validation performed by the standard API can vary depending on the implementation, and any number of validation approaches can be used individually or in combination to validate the tenant-specified custom data included in the request payload.

When the standard API of the cloud computing platform successfully processes the request payload at 530 and/or 540, at step 550, the standard API can generate a response having a response payload that includes the tenant-specified custom data, and send the response from the cloud computing platform to an external application of the customer.

Examples

As described above, standard APIs are able to accept tenant-specified customizations via request payloads that are passed to standard APIs as map of one or more key-value pairs (e.g., for custom objects and/or custom fields as two non-limiting examples), process and validate the tenant-specified customizations, store values from the tenant-specified customizations, and return tenant-specified customizations via response payloads that can be passed from standard APIs as a map of one or more key-value pairs (e.g., for custom objects and/or custom fields as two non-limiting examples). A few non-limiting examples of request and response payloads will now be described with reference to FIGS. 6-8.

FIG. 6 is an example that illustrates a request payload 610 and a response payload 620 that can be used in the implementation of a standard payment API that uses custom fields 612, 622 in accordance with the disclosed embodiments. In this example, the request payload 610 includes standard fields for "amount" having a value 150$, "comments" having a value "capture request" and "creditCard" which has standard fields for "cardNUmber" which as a value "4111111111111111", "cvv" which has a value "123", and "name" which has a value "Ravi Shankar". In accordance with the disclosed embodiments, the request payload 610 has also been customized to include a custom field 612. The custom field 612 includes a key "middleName" which has the value "Peter". Thus, in this example, the key-value pair is "middleName" and "Peter". The response payload 620 includes a number of standard fields (not listed for sake of simplicity) that are returned by the standard payment API, and in accordance with the disclosed embodiments, the response payload 620 has also been customized to include a custom field 622. Thus custom field 622 includes a key "security code" which has the value "21". Thus, in this example, the key-value pair is "security code" and "21".

FIG. 7 is an example that illustrates a request payload 710 and a response payload 720 that can be used in the implementation of a standard payment API that uses custom objects 712, 722 in accordance with the disclosed embodiments. In this example, the request payload 710 includes standard fields for "amount" having a value 150$ and "comments" having a value "capture request". In accordance with the disclosed embodiments, the request payload 710 has also been customized to include a custom object 712. The custom object 712 has various custom fields including a custom field having a key "name" and a corresponding value "bitCoin", a custom field having a key "username" and a corresponding value "UserName", a custom field having a key "passcode" and a corresponding value "1212" and a custom field having a key "hash" and a corresponding value "1212". The response payload 720 includes a number of standard fields (not listed for sake of simplicity) that are returned by the standard payment API, and in accordance with the disclosed embodiments, the response payload 720 has also been customized to include a custom object 722 that has various custom fields including a custom field having a key "id" and a corresponding value "3edAx00000000001EAA", a custom field having a key "name" having a value "bitCoin", a custom field having a key "username" and a corresponding value "UserName", and a custom field having a key "passcode" and a corresponding value "12**".

FIG. 8 is an example that illustrates a request payload 810 and a response payload 820 that can be used in the implementation of a standard order API that uses custom fields 812, 822 in accordance with the disclosed embodiments. In this example, the request payload 810 includes standard fields for "comments" having a value "place order request" and "orderItems" which has standard fields for "name" which as a value "shirt", and "quantity" which has a value "1". In accordance with the disclosed embodiments, the standard field "orderItems" of the request payload 810 has also been customized to include a custom field 812 having a key "discount" and a corresponding value "10%". The response payload 820 includes a number of standard fields that are returned by the standard payment API including "comments" which has a value "place order successfully", and "order items" which has a number of standards fields. The standard field "order items" includes standard fields "id", "name", "quantity" and "total price", and in accordance with the disclosed embodiments, has also been customized to include a custom field 822 having a key "discount" and a corresponding value "10%".

The following description is of one example of a system in which the features described above may be implemented. The components of the system described below are merely one example and should not be construed as limiting. The features described above may be implemented in any other type of computing environment, such as one with multiple servers, one with a single server, a multi-tenant server environment, a single-tenant server environment, or some combination of the above.

Figure 9:
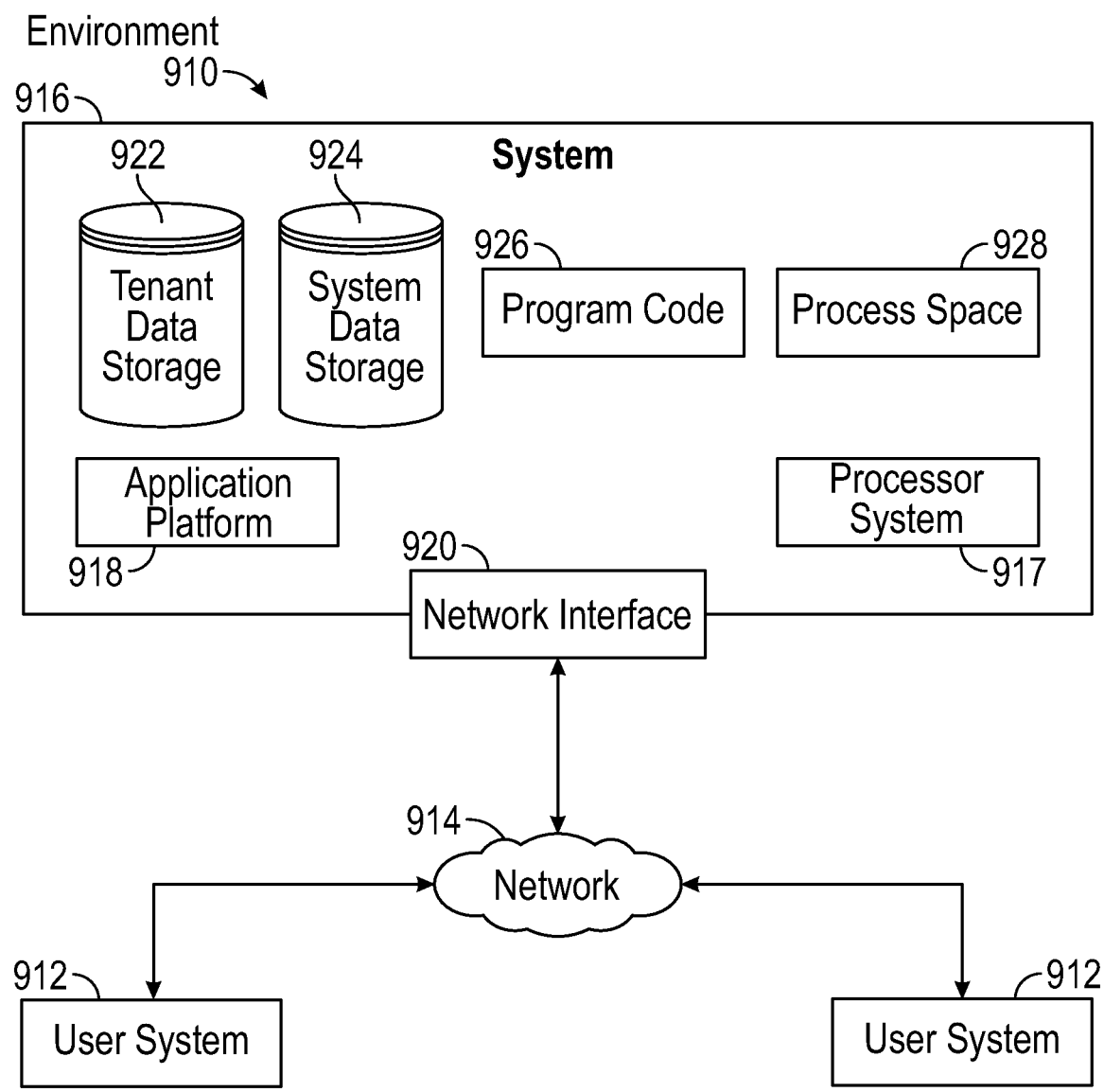
FIG. 9 shows a block diagram of an example of an environment in which an on-demand database service can be used in accordance with some implementations.

FIG. 9 shows a block diagram of an example of an environment 910 in which an on-demand database service can be used in accordance with some implementations. The environment 910 includes user systems 912, a network 914, a database system 916 (also referred to herein as a "cloud-based system"), a processor system 917, an application platform 918, a network interface 920, tenant database 922 for storing tenant data 923, system database 924 for storing system data 925, program code 926 for implementing various functions of the system 916, and process space 928 for executing database system processes and tenant-specific processes, such as running applications as part of an application hosting service. In some other implementations, environment 910 may not have all of these components or systems, or may have other components or systems instead of, or in addition to, those listed above.

In some implementations, the environment 910 is an environment in which an on-demand database service exists. An on-demand database service, such as that which can be implemented using the system 916, is a service that is made available to users outside of the enterprise(s) that own, maintain or provide access to the system 916. As described above, such users generally do not need to be concerned with building or maintaining the system 916. Instead, resources provided by the system 916 may be available for such users' use when the users need services provided by the system 916; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 918 can be a framework that allows the applications of system 916 to execute, such as the hardware or software infrastructure of the system 916. In some implementations, the application platform 918 enables the creation, management and execution of one or more applications developed by the provider of the on-demand database service, users accessing the on-demand database service via user systems 912, or third-party application developers accessing the on-demand database service via user systems 912.

In some implementations, the system 916 implements a web-based customer relationship management (CRM) system. For example, in some such implementations, the system 916 includes application servers configured to implement and execute CRM software applications as well as provide related data, code, forms, renderable webpages and documents and other information to and from user systems 912 and to store to, and retrieve from, a database system related data, objects, and Webpage content. In some MTS implementations, data for multiple tenants may be stored in the same physical database object in tenant database 922. In some such implementations, tenant data is arranged in the storage medium(s) of tenant database 922 so that data of one tenant is kept logically separate from that of other tenants so that one tenant does not have access to another tenant's data, unless such data is expressly shared. The system 916 also implements applications other than, or in addition to, a CRM application. For example, the system 916 can provide tenant access to multiple hosted (standard and custom) applications, including a CRM application. User (or third-party developer) applications, which may or may not include CRM, may be supported by the application platform 918. The application platform 918 manages the creation and storage of the applications into one or more database objects and the execution of the applications in one or more virtual machines in the process space of the system 916.

According to some implementations, each system 916 is configured to provide webpages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 914 can be or include any network or combination of networks of systems or devices that communicate with one another. For example, the network 914 can be or include any one or any combination of a LAN (local area network), WAN (wide area network), telephone network, wireless network, cellular network, point-to-point network, star network, token ring network, hub network, or other appropriate configuration. The network 914 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 912 can communicate with system 916 using TCP/IP and, at a higher network level, other common Internet protocols to communicate, such as HTTP, FTP, AFS, WAP, etc. In an example where HTTP is used, each user system 912 can include an HTTP client commonly referred to as a "web browser" or simply a "browser" for sending and receiving HTTP signals to and from an HTTP server of the system 916. Such an HTTP server can be implemented as the sole network interface 920 between the system 916 and the network 914, but other techniques can be used in addition to or instead of these techniques. In some implementations, the network interface 920 between the system 916 and the network 914 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 912 can be implemented as any computing device(s) or other data processing apparatus or systems usable by users to access the database system 916. For example, any of user systems 912 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 912 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 916) of the user system 912 to access, process and view information, pages and applications available to it from the system 916 over the network 914.

Each user system 912 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 912 in conjunction with pages, forms, applications and other information provided by the system 916 or other systems or servers. For example, the user interface device can be used to access data and applications hosted by system 916, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 912 may differ in their respective capacities, and the capacity of a particular user system 912 can be entirely determined by permissions (permission levels) for the current user of such user system. For example, where a salesperson is using a particular user system 912 to interact with the system 916, that user system can have the capacities allotted to the salesperson. However, while an administrator is using that user system 912 to interact with the system 916, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 912 and some or all of its components are operator-configurable using applications, such as a browser, including computer code executed using a central processing unit (CPU) such as an Intel Pentium® processor or the like. Similarly, the system 916 (and additional instances of an MTS, where more than one is present) and all of its components can be operator-configurable using application(s) including computer code to run using the processor system 917, which may be implemented to include a CPU, which may include an Intel Pentium® processor or the like, or multiple CPUs.

The system 916 includes tangible computer-readable media having non-transitory instructions stored thereon/in that are executable by or used to program a server or other computing system (or collection of such servers or computing systems) to perform some of the implementation of processes described herein. For example, computer program code 926 can implement instructions for operating and configuring the system 916 to intercommunicate and to process webpages, applications and other data and media content as described herein. In some implementations, the computer code 926 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, JAVA®, JAVASCRIPT®, ActiveX®, any other scripting language, such as VBScript®, and many other programming languages as are well known may be used. (JAVA™ is a trademark of Sun Microsystems, Inc.).

Figure 10:
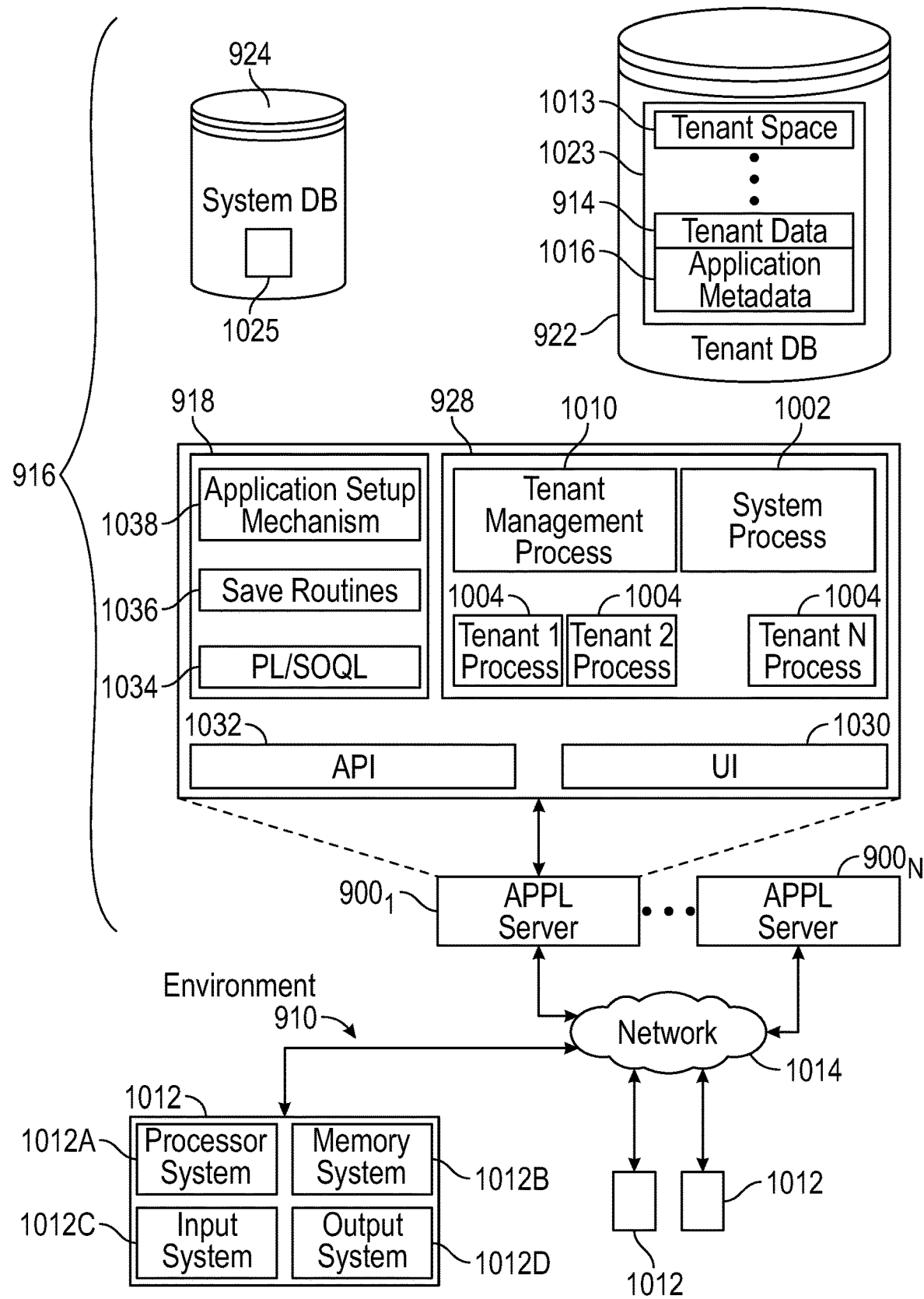
FIG. 10 shows a block diagram of example implementations of elements of FIG. 9 and example interconnections between these elements according to some implementations.

FIG. 10 shows a block diagram of example implementations of elements of FIG. 9 and example interconnections between these elements according to some implementations. That is, FIG. 10 also illustrates environment 910, but FIG. 10, various elements of the system 916 and various interconnections between such elements are shown with more specificity according to some more specific implementations. Elements from FIG. 9 that are also shown in FIG. 10 will use the same reference numbers in FIG. 10 as were used in FIG. 9. Additionally, in FIG. 10, the user system 912 includes a processor system 1012A, a memory system 1012B, an input system 1012C, and an output system 1012D. The processor system 1012A can include any suitable combination of one or more processors. The memory system 1012B can include any suitable combination of one or more memory devices. The input system 1012C can include any suitable combination of input devices, such as one or more touchscreen interfaces, keyboards, mice, trackballs, scanners, cameras, or interfaces to networks. The output system 1012D can include any suitable combination of output devices, such as one or more display devices, printers, or interfaces to networks.

In FIG. 10, the network interface 920 of FIG. 9 is implemented as a set of HTTP application servers $1000_1$-$1000_N$. Each application server 1000, also referred to herein as an "app server," is configured to communicate with tenant database 922 and the tenant data 1023 therein, as well as system database 924 and the system data 1025 therein, to serve requests received from the user systems 1012. The tenant data 1023 can be divided into individual tenant storage spaces 1013, which can be physically or logically arranged or divided. Within each tenant storage space 1013, tenant data 1014 and application metadata 1016 can similarly be allocated for each user. For example, a copy of a user's most recently used (MRU) items can be stored to tenant data 1014. Similarly, a copy of MRU items for an entire organization that is a tenant can be stored to tenant storage space 1013.

The process space 928 includes system process space 1002, individual tenant process spaces 1004 and a tenant management process space 1010. The application platform 918 includes an application setup mechanism 1038 that supports application developers' creation and management of applications. Such applications and others can be saved as metadata into tenant database 922 by save routines 1036 for execution by subscribers as one or more tenant process spaces 1004 managed by tenant management process 1010, for example. Invocations to such applications can be coded using PL/SOQL 1034, which provides a programming language style interface extension to API 1032. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes.

Invocations to applications can be detected by one or more system processes, which manage retrieving application metadata 1016 for the subscriber making the invocation and executing the metadata as an application in a virtual machine.

The system 916 of FIG. 10 also includes a user interface (UI) 1030 and an application programming interface (API) 1032 to system 916 resident processes to users or developers at user systems 1012. In some other implementations, the environment 910 may not have the same elements as those listed above or may have other elements instead of, or in addition to, those listed above.

Each application server 1000 can be communicably coupled with tenant database 922 and system database 924, for example, having access to tenant data 1023 and system data 1025, respectively, via a different network connection. For example, one application server $1000_1$ can be coupled via the network 914 (for example, the Internet), another application server $1000_N$ can be coupled via a direct network link, and another application server (not illustrated) can be coupled by yet a different network connection. Transfer Control Protocol and Internet Protocol (TCP/IP) are examples of typical protocols that can be used for communicating between application servers 1000 and the system 916. However, it will be apparent to one skilled in the art that other transport protocols can be used to optimize the system 916 depending on the network interconnections used.

In some implementations, each application server 1000 is configured to handle requests for any user associated with any organization that is a tenant of the system 916. Because it can be desirable to be able to add and remove application servers 1000 from the server pool at any time and for various reasons, in some implementations there is no server affinity for a user or organization to a specific application server 1000. In some such implementations, an interface system implementing a load balancing function (for example, an F5 Big-IP load balancer) is communicably coupled between the application servers 1000 and the user systems 1012 to distribute requests to the application servers 1000. In one implementation, the load balancer uses a least-connections algorithm to route user requests to the application servers 1000. Other examples of load balancing algorithms, such as round robin and observed-response-time, also can be used. For example, in some instances, three consecutive requests from the same user could hit three different application servers 1000, and three requests from different users could hit the same application server 1000. In this manner, by way of example, system 916 can be a multi-tenant system in which system 916 handles storage of, and access to, different objects, data and applications across disparate users and organizations.

In one example storage use case, one tenant can be a company that employs a sales force where each salesperson uses system 916 to manage aspects of their sales. A user can maintain contact data, leads data, customer follow-up data, performance data, goals and progress data, etc., all applicable to that user's personal sales process (for example, in tenant database 922). In an example of an MTS arrangement, because all of the data and the applications to access, view, modify, report, transmit, calculate, etc., can be maintained and accessed by a user system 1012 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 916 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 916 also can maintain system level data usable by multiple tenants or other data. Such system level data can include industry reports, news, postings, and the like that are sharable among tenants.

In some implementations, the user systems 1012 (which also can be client systems) communicate with the application servers 1000 to request and update system-level and tenant-level data from the system 916. Such requests and updates can involve sending one or more queries to tenant database 922 or system database 924. The system 916 (for example, an application server 1000 in the system 916) can automatically generate one or more SQL statements (for example, one or more SQL queries) designed to access the desired information. System database 924 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 11A:
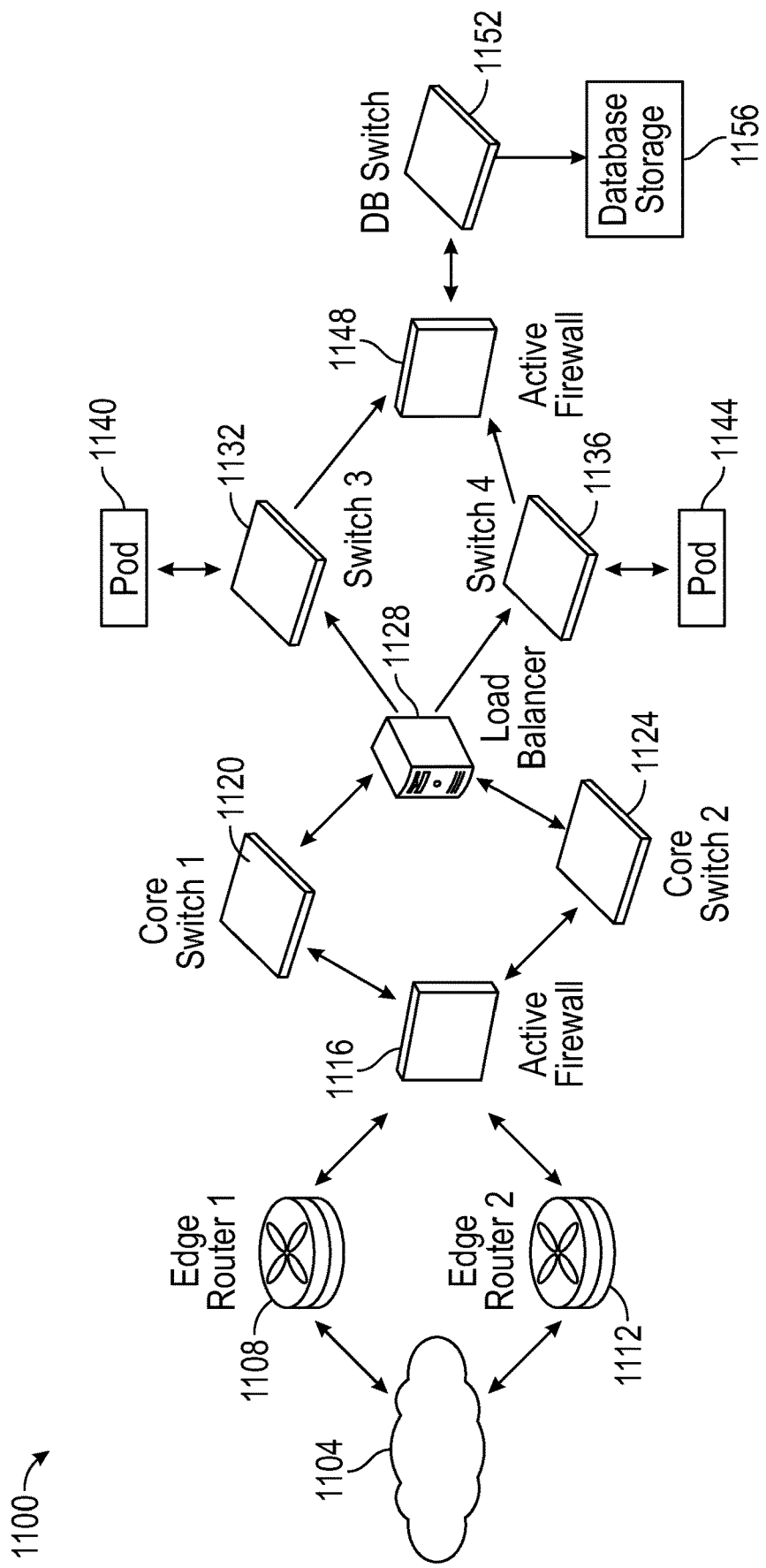
FIG. 11A shows a system diagram illustrating example architectural components of an on-demand database service environment according to some implementations.

FIG. 11A shows a system diagram illustrating example architectural components of an on-demand database service environment 1100 according to some implementations. A client machine communicably connected with the cloud 1104, generally referring to one or more networks in combination, as described herein, can communicate with the on-demand database service environment 1100 via one or more edge routers 1108 and 1112. A client machine can be any of the examples of user systems 11 described above. The edge routers can communicate with one or more core switches 1120 and 1124 through a firewall 1116. The core switches can communicate with a load balancer 1128, which can distribute server load over different pods, such as the pods 1140 and 1144. The pods 1140 and 1144, which can each include one or more servers or other computing resources, can perform data processing and other operations used to provide on-demand services. Communication with the pods can be conducted via pod switches 1132 and 1136. Components of the on-demand database service environment can communicate with database storage 1156 through a database firewall 1148 and a database switch 1152.

Figure 11B:
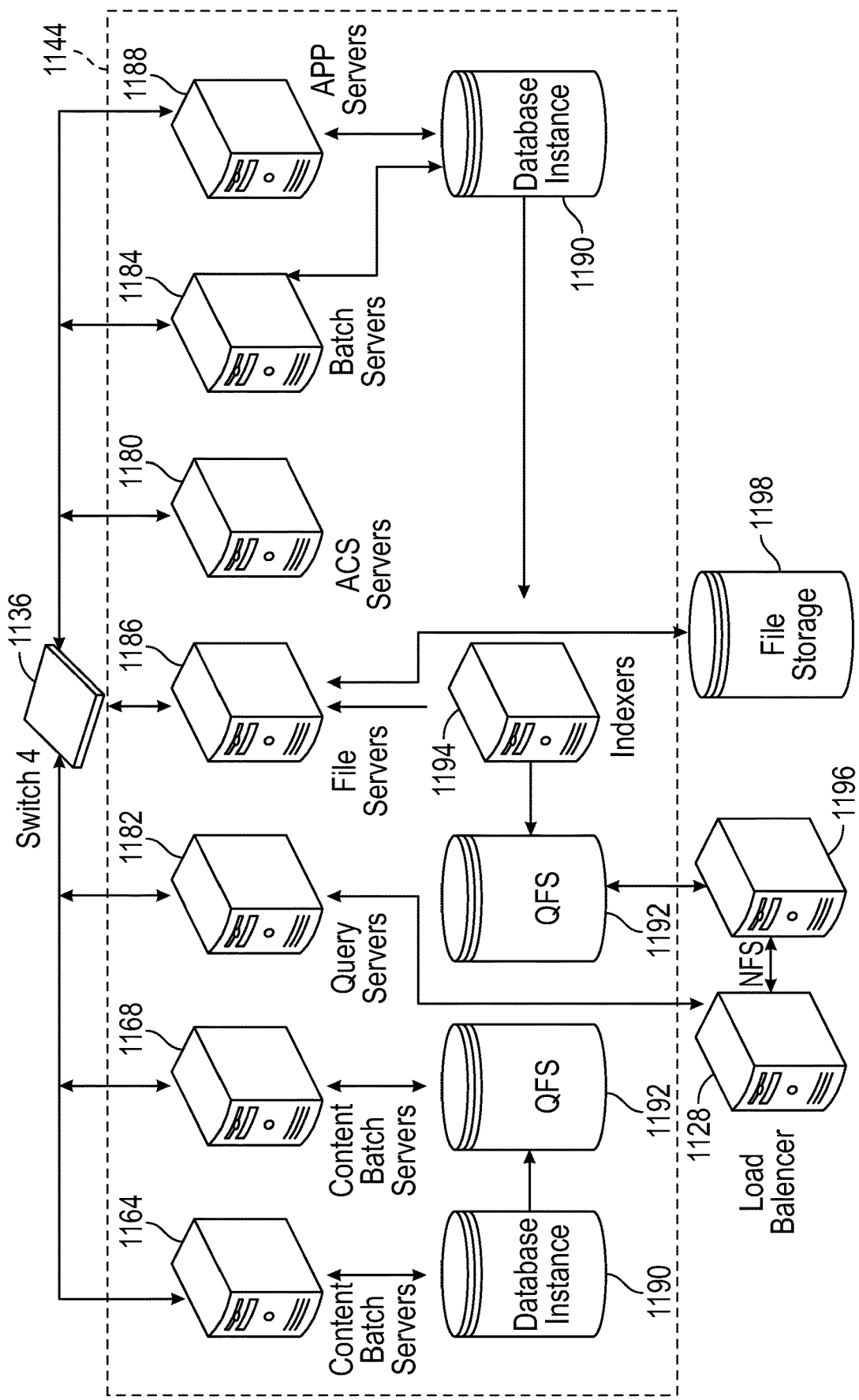
FIG. 11B shows a system diagram further illustrating example architectural components of an on-demand database service environment according to some implementations.

As shown in FIGS. 11A and 11B, accessing an on-demand database service environment can involve communications transmitted among a variety of different hardware or software components. Further, the on-demand database service environment 1100 is a simplified representation of an actual on-demand database service environment. For example, while only one or two devices of each type are shown in FIGS. 11A and 11B, some implementations of an on-demand database service environment can include anywhere from one to several devices of each type. Also, the on-demand database service environment need not include each device shown in FIGS. 11A and 11B, or can include additional devices not shown in FIGS. 11A and 11B.

Additionally, it should be appreciated that one or more of the devices in the on-demand database service environment 1100 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 1104 is intended to refer to a data network or multiple data networks, often including the Internet. Client machines communicably connected with the cloud 1104 can communicate with other components of the on-demand database service environment 1100 to access services provided by the on-demand database service environment. For example, client machines can access the on-demand database service environment to retrieve, store, edit, or process information. In some implementations, the edge routers 1108 and 1112 route packets between the cloud 1104 and other components of the on-demand database service environment 1100. For example, the edge routers 1108 and 1112 can employ the Border Gateway Protocol (BGP). The BGP is the core routing protocol of the Internet. The edge routers 1108 and 1112 can maintain a table of IP networks or 'prefixes', which designate network reachability among autonomous systems on the Internet.

In some implementations, the firewall 1116 can protect the inner components of the on-demand database service environment 1100 from Internet traffic. The firewall 1116 can block, permit, or deny access to the inner components of the on-demand database service environment 1100 based upon a set of rules and other criteria. The firewall 1116 can act as one or more of a packet filter, an application gateway, a stateful filter, a proxy server, or any other type of firewall.

In some implementations, the core switches 1120 and 1124 are high-capacity switches that transfer packets within the on-demand database service environment 1100. The core switches 1120 and 1124 can be configured as network bridges that quickly route data between different components within the on-demand database service environment. In some implementations, the use of two or more core switches 1120 and 1124 can provide redundancy or reduced latency.

In some implementations, the pods 1140 and 1144 perform the core data processing and service functions provided by the on-demand database service environment. Each pod can include various types of hardware or software computing resources. An example of the pod architecture is discussed in greater detail with reference to FIG. 11B. In some implementations, communication between the pods 1140 and 1144 is conducted via the pod switches 1132 and 1136. The pod switches 1132 and 1136 can facilitate communication between the pods 1140 and 1144 and client machines communicably connected with the cloud 1104, for example via core switches 1120 and 1124. Also, the pod switches 1132 and 1136 may facilitate communication between the pods 1140 and 1144 and the database storage 1156. In some implementations, the load balancer 1128 can distribute workload between the pods 1140 and 1144. Balancing the on-demand service requests between the pods can assist in improving the use of resources, increasing throughput, reducing response times, or reducing overhead. The load balancer 1128 may include multilayer switches to analyze and forward traffic.

In some implementations, access to the database storage 1156 is guarded by a database firewall 1148. The database firewall 1148 can act as a computer application firewall operating at the database application layer of a protocol stack. The database firewall 1148 can protect the database storage 1156 from application attacks such as structure query language (SQL) injection, database rootkits, and unauthorized information disclosure. In some implementations, the database firewall 1148 includes a host using one or more forms of reverse proxy services to proxy traffic before passing it to a gateway router. The database firewall 1148 can inspect the contents of database traffic and block certain content or database requests. The database firewall 1148 can work on the SQL application level atop the TCP/IP stack, managing applications' connection to the database or SQL management interfaces as well as intercepting and enforcing packets traveling to or from a database network or application interface.

In some implementations, communication with the database storage 1156 is conducted via the database switch 1152. The multi-tenant database storage 1156 can include more than one hardware or software components for handling database queries. Accordingly, the database switch 1152 can direct database queries transmitted by other components of the on-demand database service environment (for example, the pods 1140 and 1144) to the correct components within the database storage 1156. In some implementations, the database storage 1156 is an on-demand database system shared by many different organizations as described above.

FIG. 11B shows a system diagram further illustrating example architectural components of an on-demand database service environment according to some implementations. The pod 1144 can be used to render services to a user of the on-demand database service environment 1100. In some implementations, each pod includes a variety of servers or other systems. The pod 1144 includes one or more content batch servers 1164, content search servers 1168, query servers 1182, file force servers 1186, access control system (ACS) servers 1180, batch servers 1184, and app servers 1188. The pod 1144 also can include database instances 1190, quick file systems (QFS) 1192, and indexers 1194. In some implementations, some or all communication between the servers in the pod 1144 can be transmitted via the switch 1136.

In some implementations, the app servers 1188 include a hardware or software framework dedicated to the execution of procedures (for example, programs, routines, scripts) for supporting the construction of applications provided by the on-demand database service environment 1100 via the pod 1144. In some implementations, the hardware or software framework of an app server 1188 is configured to execute operations of the services described herein, including performance of the blocks of various methods or processes described herein. In some alternative implementations, two or more app servers 1188 can be included and cooperate to perform such methods, or one or more other servers described herein can be configured to perform the disclosed methods.

The content batch servers 1164 can handle requests internal to the pod. Some such requests can be long-running or not tied to a particular customer. For example, the content batch servers 1164 can handle requests related to log mining, cleanup work, and maintenance tasks. The content search servers 1168 can provide query and indexer functions. For example, the functions provided by the content search servers 1168 can allow users to search through content stored in the on-demand database service environment. The file force servers 1186 can manage requests for information stored in the File force storage 1198. The File force storage 1198 can store information such as documents, images, and basic large objects (BLOBs). By managing requests for information using the file force servers 1186, the image footprint on the database can be reduced. The query servers 1182 can be used to retrieve information from one or more file storage systems. For example, the query system 1182 can receive requests for information from the app servers 1188 and transmit information queries to the NFS 1196 located outside the pod.

The pod 1144 can share a database instance 1190 configured as a multi-tenant environment in which different organizations share access to the same database. Additionally, services rendered by the pod 1144 may call upon various hardware or software resources. In some implementations, the ACS servers 1180 control access to data, hardware resources, or software resources. In some implementations, the batch servers 1184 process batch jobs, which are used to run tasks at specified times. For example, the batch servers 1184 can transmit instructions to other servers, such as the app servers 1188, to trigger the batch jobs.

In some implementations, the QFS 1192 is an open source file storage system available from Sun Microsystems® of Santa Clara, Calif. The QFS can serve as a rapid-access file storage system for storing and accessing information available within the pod 1144. The QFS 1192 can support some volume management capabilities, allowing many disks to be grouped together into a file storage system. File storage system metadata can be kept on a separate set of disks, which can be useful for streaming applications where long disk seeks cannot be tolerated. Thus, the QFS system can communicate with one or more content search servers 1168 or indexers 1194 to identify, retrieve, move, or update data stored in the network file storage systems 1196 or other storage systems.

In some implementations, one or more query servers 1182 communicate with the NFS 1196 to retrieve or update information stored outside of the pod 1144. The NFS 1196 can allow servers located in the pod 1144 to access information to access files over a network in a manner similar to how local storage is accessed. In some implementations, queries from the query servers 1182 are transmitted to the NFS 1196 via the load balancer 1128, which can distribute resource requests over various resources available in the on-demand database service environment. The NFS 1196 also can communicate with the QFS 1192 to update the information stored on the NFS 1196 or to provide information to the QFS 1192 for use by servers located within the pod 1144.

In some implementations, the pod includes one or more database instances 1190. The database instance 1190 can transmit information to the QFS 1192. When information is transmitted to the QFS, it can be available for use by servers within the pod 1144 without using an additional database call. In some implementations, database information is transmitted to the indexer 1194. Indexer 1194 can provide an index of information available in the database 1190 or QFS 1192. The index information can be provided to file force servers 1186 or the QFS 1192.

Figure 12:
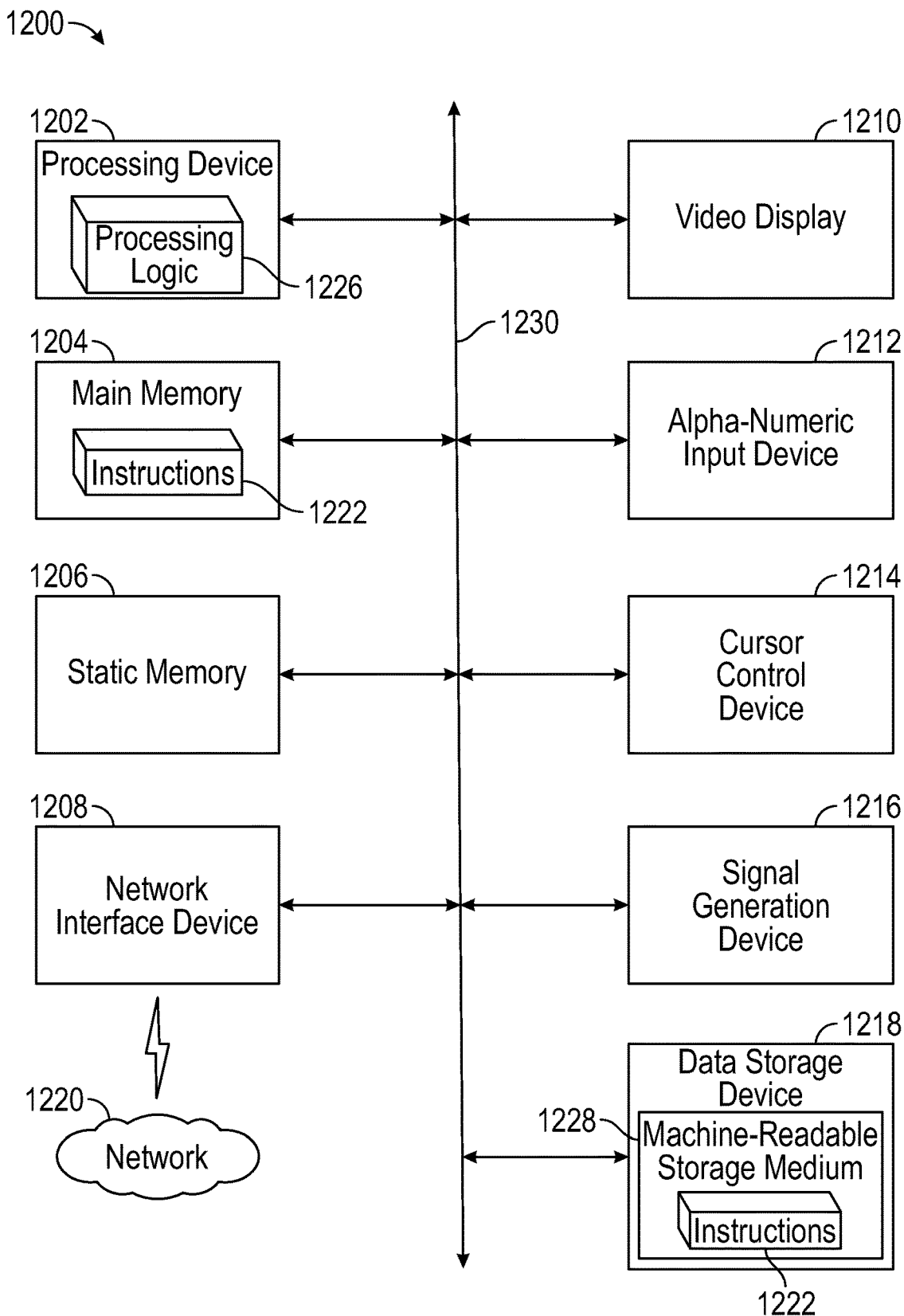
FIG. 12 is a block diagram that illustrates a diagrammatic representation of a machine in the exemplary form of a computer system within which a set of instructions, for causing the machine to perform any one or more of the methodologies discussed herein, may be executed.

FIG. 12 illustrates a diagrammatic representation of a machine in the exemplary form of a computer system 1200 within which a set of instructions, for causing the machine to perform any one or more of the methodologies discussed herein, may be executed. The system 1200 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1200 may represent application server 110.

The exemplary computer system 1200 includes a processing device (processor) 1202, a main memory 1204 (e.g., read-only memory (ROM), flash memory, dynamic random access memory (DRAM) such as synchronous DRAM (SDRAM)), a static memory 1206 (e.g., flash memory, static random access memory (SRAM)), and a data storage device 1218, which communicate with each other via a bus 1230.

Processing device 1202 represents one or more general-purpose processing devices such as a microprocessor, central processing unit, or the like. More particularly, the processing device 1202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1202 may also be one or more special-purpose processing devices such as an application specific integrated circuit (ASIC), a field programmable gate array (FPGA), a digital signal processor (DSP), network processor, or the like.

The computer system 1200 may further include a network interface device 1208. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker).

The data storage device 1218 may include a computer-readable medium 1228 on which is stored one or more sets of instructions 1222 (e.g., instructions of in-memory buffer service 114) embodying any one or more of the methodologies or functions described herein. The instructions 1222 may also reside, completely or at least partially, within the main memory 1204 and/or within processing logic 1226 of the processing device 1202 during execution thereof by the computer system 1200, the main memory 1204 and the processing device 1202 also constituting computer-readable media. The instructions may further be transmitted or received over a network 1220 via the network interface device 1208.

While the computer-readable storage medium 1228 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Particular embodiments may be implemented in a computer-readable storage medium (also referred to as a machine-readable storage medium) for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor," "processor system," or "processing system" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "analyzing," "identifying," "adding," "displaying," "generating," "querying," "creating," "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

An Application Programming Interface (API) can refer to a software interface (e.g., intermediary (code)) that provides a connection between two computers and/or software applications that allows them to communicate with each another. For example, an API can offer a service to other pieces of software. An API can standard patterns that make it easy for software applications to exchange data and functionality. The interface where systems communicate represents a set of agreed-upon standards that enables applications to make requests of a service and then to receive data or functionality in response. One purpose of APIs is to hide the internal details of how a system works, exposing only those parts a programmer will find useful and keeping them consistent even if the internal details later change. An API is often made up of different parts which act as tools or services that are available. A program that uses one of these parts is said to call that portion of the API. The calls that make up the API are also known as subroutines, methods, requests, or end-points. An API can be defined by a contract that specifies functions that can be invoked or called by a request, and data that can be passed and returned by a response. Any software that needs to send or receive data must adhere to those specifications to make a request. This contract can also be referred to as an API specification that describes how to build such a connection or interface, and defines these calls, meaning that it explains how to use or implement them. A computer system that meets this standard is said to implement or expose an API. In building applications, an API can simplify programming by abstracting the underlying implementation and only exposing objects or actions the developer needs.

Web APIs allow communication between computers that are joined by the internet. Web APIs are the defined interfaces through which interactions happen between an enterprise and applications that use its assets, which also is a Service Level Agreement (SLA) to specify the functional provider and expose the service path or URL for its API users. An API approach is an architectural approach that revolves around providing a program interface to a set of services to different applications serving different types of consumers. When used in the context of web development, an API is typically defined as a set of specifications, such as Hypertext Transfer Protocol (HTTP) request messages, along with a definition of the structure of response messages, usually in an Extensible Markup Language (XML) or JavaScript Object Notation (JSON) format. A more recent trend (so-called Web 2.0) has been moving away from Simple Object Access Protocol (SOAP) based web services and service-oriented architecture (SOA) towards more direct representational state transfer (REST) style web resources and resource-oriented architecture (ROA). Part of this trend is related to the Semantic Web movement toward Resource Description Framework (RDF), a concept to promote web-based ontology engineering technologies. Web APIs allow the combination of multiple APIs into new applications known as mashups.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for supporting tenant customizations provided by a cloud computing platform, the method comprising:
receiving, at the cloud computing platform, a request from a customer system external to the cloud computing platform, wherein the request comprises a request payload that includes one or more standard fields of a standard object and tenant-specified custom data including at least one custom field of a custom object only available to a particular tenant of a plurality of tenants of the cloud computing platform, wherein the custom object comprises an external object that maps to record data stored outside the cloud computing platform and accessed in real-time via a web service;
validating, at a standard application programming interface (API) at the cloud computing platform serving as an interface between a tenant application of the cloud computing platform comprising the custom object and an external application of the customer system external to the cloud computing platform, the request payload comprises one or more of: field metadata of the tenant-specified custom data that specifies a data type of the at least one custom field of the custom object, a number of the at least one custom field of the custom object included as part of the tenant-specified custom data that are allowed to be passed in a single API request, and a number of custom objects included as part of the tenant-specified custom data that are allowed to be passed in a single API request;
processing the request payload at the standard API of the cloud computing platform, wherein:
the standard API is available to the plurality of tenants;
the standard API is backed by the standard object having a pre-defined data structure defined by the cloud computing platform that is common to the plurality of tenants without knowledge of the tenant-specified custom data;
the standard API supports a generic set of parameters comprising the one or more standard fields that allow the standard API to process the request comprising the request payload including the one or more standard fields and the tenant-specified custom data; and
when the standard API successfully processes the request payload, the standard API generates a response having a response payload that includes a number of standard fields of the standard object and a custom field of the custom object; and
sending the response from the cloud computing platform to the customer system external to the cloud computing platform, wherein the response comprises the response payload that includes the custom field of the custom object.

2. The method according to claim 1, wherein the generic set of parameters comprises:
a map comprising at least one key-value pair, wherein the key represents the tenant-specified custom data and the value represents a value for the tenant-specified custom data.

3. The method according to claim 1, wherein the standard API is one of: a SOAP API, a REST API, a bulk API, a streaming API, a Chatter REST API, a user interface API, an analytics REST API, a metadata API, an APEX REST API, an APEX SOAP API, and a tooling API.

4. The method of claim 1, wherein the standard API comprises a standard payment API of the cloud computing platform.

5. The method of claim 4, wherein the standard object comprises a payment object.

6. The method of claim 1, wherein the standard API comprises a standard payment API of the cloud computing platform and the standard object comprises a payment object.

7. At least one non-transient computer-readable medium having instructions stored thereon that are configurable to cause at least one processor to perform the method of claim 1.

8. At least one non-transient computer-readable medium having instructions stored thereon that are configurable to cause at least one processor to perform a method for supporting tenant customizations provided by a cloud computing platform, the method comprising:
receiving, at the cloud computing platform, a request from a customer system external to the cloud computing platform, wherein the request comprises a request payload that includes one or more standard fields of a standard object and tenant-specified custom data including at least one custom field of a custom object only available to a particular tenant of a plurality of tenants of the cloud computing platform, wherein the custom object comprises an external object that maps to record data stored outside the cloud computing platform and accessed in real-time via a web service;
validating, at a standard application programming interface (API) at the cloud computing platform serving as an interface between a tenant application of the cloud computing platform comprising the custom object and an external application of the customer system external to the cloud computing platform, the request payload comprises one or more of: field metadata of the tenant-specified custom data that specifies a data type of the at least one custom field of the custom object, a number of the at least one custom field of the custom object included as part of the tenant-specified custom data that are allowed to be passed in a single API request, and a number of custom objects included as part of the tenant-specified custom data that are allowed to be passed in a single API request;
processing the request payload at the standard API of the cloud computing platform, wherein:
the standard API is available to the plurality of tenants;
the standard API is backed by the standard object having a pre-defined data structure defined by the cloud computing platform that is common to the plurality of tenants without knowledge of the tenant-specified custom data;
the standard API supports a generic set of parameters comprising the one or more standard fields that allow the standard API to process the request comprising the request payload including the one or more standard fields and the tenant-specified custom data; and when the standard API successfully processes the request payload, the standard API generates a response having a response payload that includes a number of standard fields of the standard object and a custom field of the custom object; and sending the response from the cloud computing platform to the customer system external to the cloud computing platform, wherein the response comprises the response payload that includes the custom field of the custom object.

* * * * *